July 5, 1966 H. M. MARTINEZ 3,259,736

METHODS AND APPARATUS FOR GENERATING FUNCTIONS OF A SINGLE VARIABLE

Filed May 11, 1959 10 Sheets-Sheet 1

INVENTOR.
HUGO M. MARTINEZ
BY
Paul M. Klein Jr.
ATTORNEY

INVENTOR.
HUGO M. MARTINEZ
BY
Paul M. Klein Jr.
ATTORNEY

INVENTOR.
HUGO M. MARTINEZ
BY
Paul M. Klein Jr.
ATTORNEY

INVENTOR.
HUGO M. MARTINEZ
BY
Paul M. Klein Jr.
ATTORNEY

INVENTOR.
HUGO M. MARTINEZ
BY
Paul M. Klein Jr.
ATTORNEY

INVENTOR.
HUGO M. MARTINEZ
BY
Paul M. Kamp Jr.
ATTORNEY

INVENTOR.
HUGO M. MARTINEZ
BY
Paul M. Klein Jr.
ATTORNEY

INVENTOR.
HUGO M. MARTINEZ
BY
Paul M. Klein, Jr.
ATTORNEY

INVENTOR.
HUGO M. MARTINEZ
BY
Paul M. Klein Jr.
ATTORNEY

INVENTOR.
HUGO M. MARTINEZ
BY
Paul M. Klein Jr.
ATTORNEY

United States Patent Office 3,259,736
Patented July 5, 1966

3,259,736

METHODS AND APPARATUS FOR GENERATING FUNCTIONS OF A SINGLE VARIABLE

Hugo M. Martinez, San Mateo, Calif., assignor to Yuba Consolidated Industries, Inc., San Francisco, Calif., a corporation of Delaware Filed May 11, 1959, Ser. No. 812,566
23 Claims. (Cl. 235—197)

The invention described herein may be manufactured and used by or for the Government of the United States of America for governmental purposes without the payment of any royalties thereon or therefor.

This invention relates to methods and apparatus for producing physical quantities representative of mathematical functions.

Computing devices and other equipment often require the generation of physical quantities such as voltages, currents, displacements, or the like, representative of various mathematical functions. Arrangements for accomplishing these purposes are commonly known as function generators. Prior art function generators often have been complicated and difficult to construct. An object of the present invention is to provide relatively simple, reliable, and accurate apparatus and methods for generating functions.

Other objects and many of the attendant advantages of this invention will be readily appreciated as the same becomes better understood by reference to the following detailed description when considered in connection with the accompanying drawings wherein:

FIG. 27(*b*) is a schematic diagram of a circuit using the apparatus of FIG. 26 for generating cube roots;

FIG. 28(*b*) is a schematic diagram of a circuit using the apparatus of FIG. 27(*b*) for generating cubes.

Figure 1:
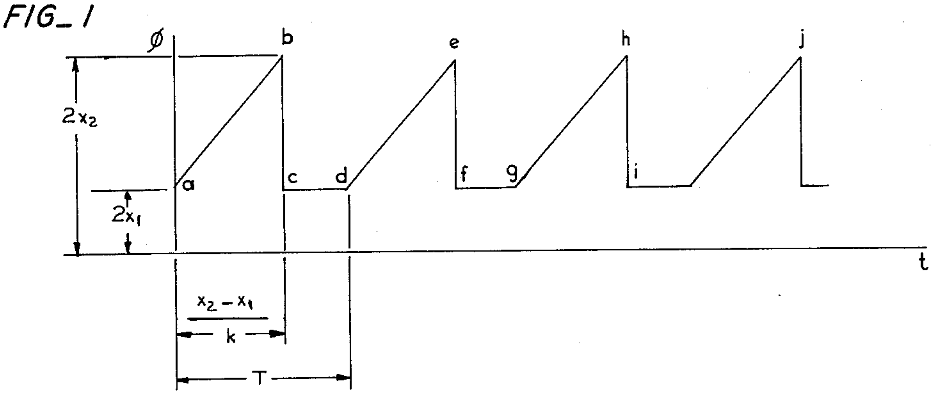
FIG. 1 is a graph illustrating a periodic time representation of a linear function having a duty cycle less than 100%.

The methods and apparatus of the invention are based on what are believed to be certain novel mathematical relations. For an adequate understanding of the invention, an exposition of these relations is first set forth herewith.

A function is a quantity which takes on a definite value, or values, when special values are assigned to certain quantities, called the arguments or independent variables of the function. Examples of functions of one variable, $x$, are the following: $2x$; $(1-x^2)$; $\sin x$; $e^{cx}$; $\log x$. These are also called functional expressions. One quantity is said to be a function of another if to each value of the second (the independent variable) there corresponds a value of the first (the dependent variable). The range of the independent variable is either explicitly stated, or understood from the context. The foregoing examples of functional expressions are specific functions of $x$. The symbols used for a general function of $x$ are $f(x)$, $g(x)$, $F(x)$, $\phi(x)$, etc. Such symbols are used when making statements that are true for several different functions, in other words, statements that are not concerned with a specific form of function. Frequently a single symbol, constituting the independent variable, is used to represent a function and is then defined as equal to the particular, specific functional expression in the dependent variable or to the general function. Thus, for example, where the symbol $y$ is used to represent a function it may, using the previous expressions as examples, be defined specifically as $y=2x$; $y=(1-x^2)$; $y=\sin x$; etc., or it may be defined in the case of a general function as $y=f(x)$; $y=g(x)$; etc.

An inverse function or the inverse of a function is the function obtained by expressing the independent variable explicitly in terms of the dependent variable and considering the dependent variable as an independent variable. If $y=f(x)$ results in $x=g(y)$, the latter is the inverse of the former (and vice versa). Thus where a function $y$ is defined as $y=2x$, the inverse function is $x=\frac{1}{2}y$. In the case of the general function where $y=f(x)$, the inverse function is written $x=f^{-1}(y)$.

It must be remembered that a function is always regarded as being confined within limits constituting the range of interest. That is, there are limiting values to the function which depend on either explicitly expressed limits of the dependent variable or, impliedly, those limits of the dependent variable for which the function is defined.

A function generator is an apparatus which, assuming the functional relation between two variables, for example, to be expressed by $y=f(x)$, will, when supplied with any particular value of $x$, say $x_0$, within the limits of the function produce the corresponding value of $y$, say $y_0$. This process of producing from a given value of $x$ the corresponding value of $y$ is called generating a function.

Denoting in general a functional relation between two variables by $y=f(x)$ and the inverse function by $$x=f^{-1}(y)$$

the method of the present invention achieves the automatic physical realization of the relation $y=f(x)$ by the use of the relation $x=f^{-1}(y)$. This means that given a specific value of $x$ in some physical form such as a voltage, current, or the like, then the corresponding value of $y$ will be generated in the same or analogous physical form, using the relation $x=f^{-1}(y)$. It is noted again that while in the relation $y=f(x)$, $x$ is the independent variable and $y$ is the dependent variable, the reverse is true in the inverse relation $x=f^{-1}(y)$. As a specific example, if $y=\text{arc} \sin x$ corresponds to $y=f(x)$ wherein $f(x)=\text{arc} \sin x$, then $x=\sin y$ corresponds to $x=f^{-1}(y)$ and $f^{-1}(y)=\sin y$.

Prior art automatic generation of functions by the use of given inverse functions has been accomplished by automatically solving the equation $x-f^{-1}(y)=0$ using $y$ as the unknown. This system is explained on page 340 of the book "Electronic Analog Computers" by G. A. Korn and T. M. Korn, published by McGraw-Hill Book Company, New York, second edition, 1956. The practical success of such equation solving methods is largely dependent on the ease with which $f^{-1}(y)$ can be generated. By generation of $f^{-1}(y)$ is meant that given a value of $y$, the corresponding value of $f^{-1}(y)$ is produced. These methods all give static representation of $f^{-1}(y)$, wherein $y$ is time independent.

In contrast to the foregoing automatic equation solving method, the method of the present invention does not rely on the solving of equations; and instead of a static representation of $f^{-1}(y)$ it uses a dynamic representation or time representation of $f^{-1}(y)$ by, in effect, replacing $y$ with real time, in which replacement an interval of time represents the range of $y$. To understand this method, an explanation of certain terms is appropriate. A time representation of a function $\phi=g(x)$ defined for $x_1 \leq x \leq x_2$ can be accomplished by letting an interval of time correspond to the range of $x$ from $x_1$ to $x_2$ and generating the function $\phi=g(x)$ as a function of time over this interval. Specifically, a transformation of $x$ to the time domain is made by the linear relation $$x=kt+x_1$$

wherein $t=0$ is the instant of time defining the start of the time interval referred to above. The size of the time interval is given by $$\frac{x_2-x_1}{k}$$

It must be noted that in each specific instance where the linear transformation to the time domain is accomplished the variable $t$ is limited in its range from zero to $$\frac{x_2-x_1}{k}$$

For example if $\phi=2x$, then a graph of the function within its necessarily prescribed limits of $x_1$ and $x_2$ would be a straight line in the $\phi$, $x$ coordinate system wherein $\phi$ is the ordinate and $x$ the abscissa and the end points of the straight line would have ordinate values of $2x_1$ and $2x_2$. When the linear transformation to the time domain is accomplished, the abscissa becomes $t$ and the equation becomes $\phi=2(kt+x_1)$. A graph of this latter equation in the $\phi$, $t$ coordinate system yields a straight line whose endpoints again have ordinate values of $2x_1$ and $2x_2$. The distance between the projections on the $t$ axis of the endpoints is $$\frac{x_2-x_1}{k}$$

since the abscissa of the lower limit of the function is $t=0$ and the abscissa of the upper limit of the function is $$t=\frac{x_2-x_1}{k}$$

The graph thus terminates very certainly at points determined by the region of interest, although $t$, the independent variable, representing real time, of course continues indefinitely and therefore $\phi=2(kt+x_1)$ could ostensibly be plotted as a line indefinitely long.

For purposes of this invention a regularly repeated time representation of the function is required. This is called a periodic time representation of the function. In general it is not practical to write an equation for a periodic time representation, although in specific cases it may be simple to do so. The equation above, $$\phi=2(kt+x_1)$$

represents the actual equation of only one portion of one cycle of the periodic representation, namely, that portion of one cycle which exhibits the functional relationship between a dependent variable and an independent variable exemplified by the equation $\phi=2x$ wherein $x$ is considered to lie only between $x_1$ and $x_2$ and wherein, correspondingly, $\phi$ varies only from $2x_1$ to $2x_2$. FIG. 1 shows one example of a periodic time representation of the function $\phi=2x$. This graph would be said to represent the functional relation $\phi=2(kt+x_1)$ in the region from $t=0$ to $$t=\frac{x_2-x_1}{k}$$

but it must be observed that in fact this functional relation holds only for the segments from $a$ to $b$, from $d$ to $e$, from $g$ to $h$, etc., and then only if $t$ be regarded as starting at zero at each low terminus, i.e., at $a$, again at $d$, again at $g$, etc. The segments of the graph from $b$ to $c$, from $c$ to $d$, from $e$ to $f$, from $f$ to $g$, etc., are not represented by the equation $\phi=2(kt+x_1)$.

From the foregoing it is clear that a periodic representation of a function involves displaying the function repetitively in time in such a manner that equal intervals of time correspond to the range of the independent variable. Thus in FIG. 1, which illustrates a periodic time representation of the functional relation $\phi=2x$ wherein $x$, the independent variable, ranges from $x_1$ to $x_2$, the interval of time represented by the lengths $ac$, $df$, etc. corresponds to the range of $x$ from $x_1$ to $x_2$. From the graph in FIG. 1, it is seen that the basic period of the graph, T, is represented by the lengths *ad, dg,* etc. As shown, only a portion of each basic period of the time representation is occupied by the function, e.g., the time intervals represented by abscissa lengths *ac, df,* etc. The functional relation is not being represented during a portion of each period shown as the time intervals *bcd, efg,* etc., each of which has a duration $$T-\frac{x_2-x_1}{k}$$

The present invention can use periodic time representations of the type shown in FIG. 1 wherein the repeated representations of the functional relation of interest are separated by a line on the graph representing a value or values not essentially of interest. The invention can also use another type of periodic time representation wherein the functional relation of interest effectively occupies the entire period of time under consideration. This other type of periodic time representation falls in two categories: (1) Where the repeated representations of the functional relation of interest are contiguous, and (2) where the functional relation of interest is contiguous to and alternates with its mirror image. This latter type of periodic time representation is the most common and the simplest to use and to understand in its behavior in the practice of the invention. The former type, exemplified in FIG. 1, is sometimes more convenient to produce. An explanation of the generation and use of this former type in the invention is set forth hereinafter in relation to the embodiments of FIGS. 26 and 27.

The common term for a device which gives a periodic time representation of a function is a wave form generator. In contrast to this, the term "function generator" implies a device such that if a value of an independent variable is introduced, the device produces the corresponding functional value. The independent variable may or may not be varying with time. If the wave form generator produces a periodic time representation wherein each functional display follows its predecessor immediately with no "dead interval" between them, the periodic time representation is said to have a 100% duty cycle. In FIG. 1 if the abscissa intervals *cd, fg,* etc., were each reduced to zero the representation would have a 100% duty cycle. The actual duty cycle of FIG. 1 is given by $$\frac{x_2-x_1}{kT}\%$$

The useful terms for describing this invention having been defined, a proof and explanation will now be offered of the novel mathematical relation on which are based the method and apparatus of this invention.

A RELATION BETWEEN A FUNCTION AND ITS INVERSE

Given a function $f(x)$ defined for $a \leq x \leq b$, let $y_0$ denote a particular but arbitrary value of the dependent variable $y$. Define the variable E as $$E=\begin{cases}A_1 \text{ if } y\leq y_0.\\ A_2 \text{ if } y>y_0.\end{cases}$$

where $A_1$ and $A_2$ are quantities independent of the variable $x$. Obtain the average value of E over the range of $x$. With the appropriate choice of values for the constants $A_1$ and $A_2$, depending upon the nature of $f(x)$, it develops that for many functions of practical importance, the relation $$E_{\text{ave}}=kf^{-1}(y_0)$$

holds, with $k$ independent of $y$.

As an illustration, let $f(x)=x^3$, $a\leq x\leq b$, and define E as $$E=\begin{cases}b \text{ if } y\leq y_0.\\ a \text{ if } y>y_0.\end{cases}$$

Then, $$E_{\text{ave}}=\frac{1}{(b-a)}\int_a^b E dx=\frac{1}{b-a}\left[\int_a^{x_0=f^{-1}(y_0)} b dx+\int_{x_0}^b a dx\right]$$
$$=\frac{1}{b-a}[b(x_0-a)+a(b-x_0)]$$
$$=x_0=f^{-1}(y_0)$$

The following is concerned with establishing general formulas for $E_{\text{ave}}$ for a large class of functions of practical importance. Interest thus centers upon the integral $$\int_a^b E(y, y_0)dx \tag{1}$$

Evaluation of this integral depends, of course, upon the nature of $f(x)$, but attention is here restricted to cases where the integration is, in the first place, possible. Consider next, then, the values of $x$ in the interval $[a,b]$ which correspond to $y=y_0$, that is, the set of $x$ such that $f(x)=y_0$. Let $x_{0m}$ and $x_{0M}$ denote, respectively, the minimum and maximum values of $x$ in the set $f^{-1}(y_0)$. Then $$\int_a^b E dx=\int_a^{x_{0m}} E dx+\int_{x_{0m}}^{x_{0M}} E dx+\int_{x_{0M}}^b E dx \tag{2}$$

Evaluation of the first and last integrals presents no problem since the integrands are either $A_1$ or $A_2$. However, the second integral requires careful consideration of the nature of the set $f^{-1}(y_0)$. Only the case of principal interest, namely when the set $f^{-1}(y_0)$ is finite, will be considered here. Accordingly, if $f^{-1}(y_0)$ has cardinality $n$, let $x_{0i}$ denote the $i$th value of $x$ in the set $f^{-1}(y_0)$, with $x_{01}=x_{0m}$ and $x_{0n}=x_{0M}$. Then, $$\int_{x_{0m}}^{x_{0M}} E dx=\int_{x_{01}}^{x_{02}} E dx+\int_{x_{02}}^{x_{03}} E dx+\cdots+\int_{x_{0(n-1)}}^{x_{0n}} E dx \tag{3}$$

Imposing the further restriction that for no $x_{0i}$ is $f(x_{0i})$ a maximum or minimum, then, with $n$ even, the first and last integrals of (2) will have the *same* integrand values, that is, both $A_1$ or both $A_2$. If $n$ is odd, one will be $A_1$ and the other $A_2$. We may, therefore, write for $n$ even, $$\int_a^b E dx=$$
$$\begin{cases}(x_{01}-a)A_1+(x_{02}-x_{01})A_2+(x_{03}-x_{02})A_1+\ldots+\\ \quad (x_{0n}-x_{0(n-1)})A_2+(b-x_{0n})A_1\\ \qquad\text{or}\\ (x_{01}-a)A_2+(x_{02}-x_{01})A_1+(x_{03}-x_{02})A_2+\ldots+\\ \quad (x_{0n}-x_{0(n-1)})A_1+(b-x_{0n})A_2\end{cases}$$

and for $n$ odd, $$\int_a^b E dx=$$
$$\begin{cases}(x_{01}-a)A_1+(x_{02}-x_{01})A_2+(x_{03}-x_{02})A_1+\ldots+\\ \quad (x_{0n}-x_{0(n-1)})A_1+(b-x_{0n})A_2\\ \qquad\text{or}\\ (x_{01}-a)A_2+(x_{02}-x_{01})A_1+(x_{03}-x_{02})A_2+\ldots+\\ \quad (x_{0n}-x_{0(n-1)})A_2+(b-x_{0n})A_1\end{cases}$$

Collecting terms and simplifying, the general formula for $$\int_a^b E dx$$

can be written as $$\int_a^b E\,dx=$$

$$\begin{cases}(A_1-A_2)\left[\sum_{i=1}^{n}(-1)^{i+1}x_{0i}\right]+A_1(b-a), \text{ for } n \textit{ even} \text{ and } f(x_{01})-f(x_{01}-\epsilon)>0 & (4a)\\ (A_2-A_1)\left[\sum_{i=1}^{n}(-1)^{i+1}x_{0i}\right]+A_2(b-a), \text{ for } n \textit{ even} \text{ and } f(x_{01})-f(x_{01}-\epsilon)<0 & (4b)\\ (A_1-A_2)\left[\sum_{i=1}^{n}(-1)^{i+1}x_{0i}\right]+A_2b-A_1a, \text{ for } n \textit{ odd} \text{ and } f(x_{01})-f(x_{01}-\epsilon)>0 & (4c)\\ (A_2-A_1)\left[\sum_{i=1}^{n}(-1)^{i+1}x_{01}\right]+A_1b-A_2a, \text{ for } n \textit{ odd} \text{ and } f(x_{01})-f(x_{01}-\epsilon)<0 & (4d)\end{cases}$$

where $f(x_{01})=y_0$, $i=1, 2, \ldots n$;

$$E=\begin{cases}A_1 \text{ if } y\leq y_0\\ A_2 \text{ if } y>y_0\end{cases}$$

and $0<\epsilon\leq(x_{01}-a)$. In the event that $y_0$ is a maximum or minimum for one or more $x_{0i}$, then each such $x_{0i}$ must be treated as two points with a corresponding increase in the value of $n$. Formulas 4*a* through 4*d* will then apply.

It may be noted that results in the several foregoing analyses would be substantially the same if E were alternatively defined as $$E=\begin{cases}A_1 \text{ if } y<y_0\\ A_2 \text{ if } y\geq y_0\end{cases}$$

or $$E=\begin{cases}A_1 \text{ if } y<y_0\\ A_2 \text{ if } y>y_0\\ K \text{ if } y=y_0\end{cases}$$

where K is a constant of any finite value.

*Examples*

(1) $y=x^3$, $a\leq x\leq b$: Here $f^{-1}(y_0)=y_0^{1/3}$; and since there is only one real valued root for $y_0$, $n=1$. Further, $f(x_0)-f(x_0-\epsilon)>0$ for every $x_0$ because $x^3$ is an increasing function. Formula 4*c* is therefore applicable and leads to the expression $$\int_a^b E(y, y_0)\,dx=(A_1-A_2)x_0+A_2b-A_1a$$

Dividing through by $(b-a)$ to obtain $E_{ave}$, $$E_{ave}=\frac{1}{(b-a)}[A_1-A_2)x_0+A_2b-A_1a]$$

Letting $A_1=b$ and $A_2=a$, then $E_{ave}=x_0$.

(2) $y=x^2$, $-a\leq x\leq a$, $a>0$: Here $f^{-1}(y_0)=\pm\sqrt{y_0}$; therefore, $n=2$, $x_{01}=-\sqrt{y_0}$ and $x_{02}=\sqrt{y_0}$. Also, $$f(x_{01})-f(x_{01}-\epsilon)<0$$

hence, Formula 4*b* is applicable, resulting in $$E_{ave}=\frac{1}{2a}[(A_2-A_1)(x_{01}-x_{02})+A_2\cdot 2a]$$

Now using the fact that $x_{02}=-x_{01}$ and choosing $A_1=a$, $A_2=0$, leads to $$E_{ave}=-x_{01}=\sqrt{y_0}$$

(3) $y=\sin x$, $0\leq x\leq 2\pi$: Since $f^{-1}(y_0)=\arcsin y_0$, then $n=3$ if $y_0=0$, and $n=2$ if $y_0\neq 0$. It is recalled here that values of $x$ for which $y$ is a maximum or minimum (when $y_0=\pm 1$) are each to be treated as two points.

(*a*) For $y_0>0$, relation (4*a*) holds.

$$E_{ave}=\frac{1}{2\pi}[(A_1-A_2)(x_{01}-x_{02})+2\pi A_1]$$

$$=\frac{1}{2\pi}\{(A_1-A_2)[x_{01}-(\pi-x_{01})]+2\pi A_1\}$$

since $x_{02}=\pi-x_{01}$.

If we choose $A_1=\pi/2$ and $A_2=-\pi/2$, then $$E_{ave}=\frac{1}{2\pi}[\pi(2x_{01}-\pi)+\pi 2]$$

$$=x_{01}$$

(*b*) For $y_0<0$, relation (4*b*) is applicable. Hence, $$E_{ave}=\frac{1}{2\pi}[(A_2-A_1)(x_{01}-x_{02})+2\pi A_2]$$

$$=\frac{1}{2\pi}\{(A_2-A_1)[x_{01}-(3\pi-x_{01})]+2\pi A_2\}$$

since $x_{02}=3\pi-x_{01}$.

Again letting $A_1=\pi/2$ and $A_2=-\pi/2$ as in case (*a*), $$E_{ave}=\frac{1}{2\pi}[-\pi(2x_{01}-3\pi)-\pi^2]$$

$$=\pi-x_{01}$$

the supplement of $x_{01}$.

(*c*) For $y_0=0$, relation (4*c*) is used. Therefore, $$E_{ave}=\frac{1}{2\pi}[(A_1-A_2)(x_{01}-x_{02}+x_{03})+2\pi A_2]$$

Once again, letting $A_1=\pi/2$, $A_2=-\pi/2$ and noting that $x_{01}=0$, $x_{02}=\pi$, $x_{03}=2\pi$, the result is $$E_{ave}=\frac{1}{2\pi}[\pi(0-\pi+2\pi)-\pi^2]$$

$$=0 \text{ as required}$$

The significant result in this example is that by letting $A_1=\pi/2$ and $A_2=-\pi/2$ for all three cases corresponding to $y_0\leq 0$ and $y_0>0$, the value of $E_{ave}$ in each case corresponds to a correct, but numerically smallest member of the set arc sin $y_0$. One can therefore write $E_{ave}=\arcsin y_0$, $-\pi/2\leq E_{ave}\leq\pi/2$. This result is extensively employed in the section on illustrative applications.

(4) Monotonic functions: Monotonic functions with single valued inverses are readily handled by Formula 4*c* if the function is increasing (Example 1) and by (4*d*) if it is decreasing. If the function $f(x)$, $a\leq x\leq b$, is an increasing one, it follows from (4*c*) that choice of $A_1=b$ and $A_2=a$ makes $E_{ave}=f^{-1}(y_0)$. On the other hand, if $f(x)$ is decreasing, Formula 4*d* indicates choosing $A={}_1a$ and $A={}_2b$ to make $E_{ave}=f^{-1}(y_0)$.

None of the Formulas 4*a* through 4*d* are applicable however, to monotonic functions with multiple valued inverses because they were developed by assuming all sets $f^{-1}(y)$ to be finite. This condition of finiteness does not hold for monotonic functions with multiple valued inverses. Appeal must therefore be made to Equation 2. The integrand of the second integral on the right will be the same as that of the first, leading to $$\int_a^b E\,dx=\int_a^{x_{0M}} A_1\,dx+\int_{x_{0M}}^b A_2\,dx$$

for a non-decreasing function, and to $$\int_a^b E\,dx=\int_a^{x_{0M}} A_2\,dx+\int_{x_{0M}}^b A_1\,dx$$

for a non-increasing function, hence, $$\int_a^b E\,dx=\begin{cases}A_1(x_{0M}-a)+A_2(b-x_{0M}), f(x) \text{ non-decreasing.}\\ A_2)x_{0M}-a)+A_1(b-x_{0M}), f(x) \text{ non-decreasing.}\end{cases}$$

If for $f(x)$ non-decreasing the choice $A_1=b$, $A_2=a$ is made, and for $f(x)$ non-increasing $A_1=a$, $A_2=b$, then in either case $E_{ave}=X_{0M}$=maximum member of the set $f^{-1}(y_0)$.

In the foregoing examples it was shown that the appropriate choice of values for $A_1$ and $A_2$ in the variable $E(y,y_0)$ leads to an average of this variable which is equal to the least of the inverse values $f^{-1}(y_0)$. The invention uses this mathematical principle for the following method of generation of a function of a single variable $f(x)$. By generation of a function of a variable is meant the production of a physical quantity such as voltage, current, electrical resistance, mechanical displacement or the like whose magnitude varies in accordance with the variation of the function of the variable.

METHOD OF FUNCTION GENERATION

Object: To generate $y=f(x)$.

*Step 1.*—Generate a periodic time representation of the inverse function $f^{-1}(y)$.

*Step 2.*—Compare the amplitude of this time function with a given value $x_0$ of the independent variable of the required function $f(x)$.

*Step 3.*—Generate, as a result of Step 2, a discontinuous function $$E(x, x_0)=\begin{cases}A_1 \text{ if } x\leq x_0.\\ A_2 \text{ if } x>x_0.\end{cases}$$

where the values of $A_1$ and $A_2$ are time independent, or at least do not vary appreciably over a single period of $f^{-1}(y)$.

*Step 4.*—Take the time average of $E(x,x_0)$. This time average, for appropriately chosen values of $A_1$ and $A_2$, is proportional to the value of the dependent variable $y$ corresponding to $x=x_0$.

It should be noted that the value of $x$, namely $x_0$, is permitted only at a rate which is much smaller than $1/T$, the repetition rate of the periodic time representation of the inverse function $f^{-1}(y)$. Also, it should be noted that if the function $f^{-1}(y)$ happens to be inherently periodic, its period need not correspond identically with the period, T, chosen for the periodic time representation of $f^{-1}(y)$ in the method of this invention. For example if $f^{-1}(y)=\sin\theta$, its period would normally be regarded as $2\pi$ radians, constituting the length of the shortest equal sub-interval into which the range of the independent variable, $\theta$, can be divided and obtain exactly the same graph of the function in each sub-interval. However, in practicing the method of the invention, wherein it is required to present a periodic time representation of $f^{-1}(y)=\sin\theta$, which involves the substitution of $(kt+\theta_1)$ for $\theta$, it is possible within the scope of the invention to choose a period T for the function $\sin(kt+\theta_1)$ corresponding to a range of $\theta$ over only $\pi$ radians. In such a case the periodic time representation of $f^{-1}(y)$ would preferably be made up of a repetitive presentation in regular sequence of only that generally S-shaped portion of the ordinary sine graph lying between $-\pi/2$ and $+\pi/2$.

GENERALIZATION OF BASIC METHOD OF FUNCTION GENERATION

The symbolic expression in Step 3, of the aforementioned method implies at first blush that it is required to generate (1) $E=A_1$ during the time interval, say $\Delta$, throughout which $x\leq x_0$, and (2) $E=A_2$ during the time interval, say $\delta$, throughout which $x>x_0$.

However, since Step 4 requires taking a time average of E, it should be apparent to those skilled in the art that exactly the same end result will be obtained if (1) E is caused to have the value $A_1$ not during the time interval, $\Delta$, wherein $x\leq x_0$, but during a different time interval, say $\Delta'$, so long as $\Delta=\Delta'$; that is, so long as the length of time in the interval $\Delta'$ equals that in the interval $\Delta$; and (2) E is caused to have the value $A_2$ not during the interval, $\delta$, wherein $x>x_0$, but during a different time interval, say $\delta'$, so long as $\delta'=\delta$.

Referring the explanation for simplicity to the occasion of a single time representation of the inverse functional relation, the significant fact is that the two values $A_1$ and $A_2$ of E divide between them an interval of time equal to the total length of time during which the time representation of the inverse functional relation occurs. Actually, the generation of E need not even be simultaneous with the time representation of the inverse functional relation although in practice it is. The share of time interval asigned to $A_1$ is equal to the length of time that $x\leq x_0$ and the remainder of the time interval is assigned to $A_2$. However, it is totally immaterial to the value of the end result, namely the time average of E, whether $A_1$ takes its share from the first portion of the time interval or from the last portion of the time interval or from the middle portion of the time interval or partly from two or more such portions.

From the foregoing it is clear that the following is a

GENERALIZED STATEMENT OF THE METHOD OF FUNCTION GENERATION

Object: To generate $y=f(x)$.

*Step 1.*—Generate a periodic time representation of the inverse function $f^{-1}(y)$.

*Step 2.*—Compare the amplitude of this time function with a given value $x_0$ of the independent variable of the required function $f(x)$.

*Step 3.*—Generate, as a result of Step 2, a discontinuous function $$E(x, x_0)=\begin{cases}A_1 \text{ during an interval of time equal to that when } x\leq x_0.\\ A_2 \text{ during an interval of time equal to that when } x>0.\end{cases}$$

where the values of $A_1$ and $A_2$ are time independent, or at least do not vary appreciably over a single period of $f^{-1}(y)$.

*Step 4.*—Take the time average of $E(x,x_0)$. This time average, for approximately chosen values of $A_1$ and $A_2$, is proportional to the value of the dependent variable $y$ corresponding to $x=x_0$.

It should be noted that the more extensively verbalized expression E in Step 3 immediately above is fully equivalent to and interchangeable with the more succinct, predominantly symbolic expression in Step 3 of the earlier recitation of the method. Although the predominantly symbolic expression, being more convenient to write, will be generally used hereinafter, it must be understood and interpreted always to include the generalized expression.

Figure 2:
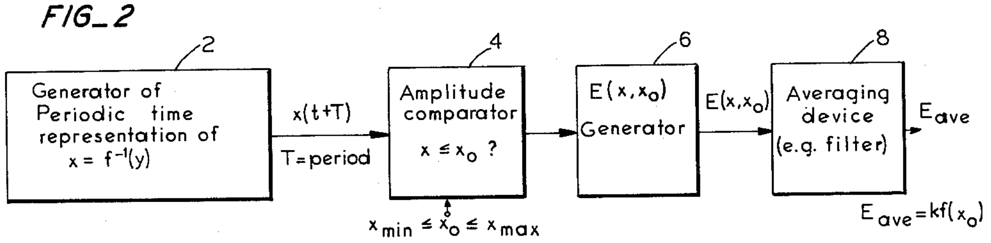
FIG. 2 is a block diagram showing one apparatus of this invention.

FIG. 2 shows diagrammatically one apparatus of the present invention for carrying out the aforeescribed method of function generation.

Numeral 2 indicates a generator of the periodic time representation of $x=f^{-1}(y)$. The output of this generator, being, for example, a voltage or the like, represented by the expression $x(t+T)$, is fed into an amplitude comparator 4 into which is also fed the physical quantity such as voltage, representing $x_0$, the given value of $x$ for which it is desired to produce the corresponding value of the function of $x$. The amplitude comparator 4 compares the value of $x_0$ with the value of $x$ generated by the generator 2 as that value of $x$ varies within the region of interest during the time cycle. During the period of time when $x$, the output of generator 2, is less than or equal to $x_0$, the amplitude comparator 4 puts out a first signal and during the time while the value of $x$ fed into the amplitude comparator exceeds the value $x_0$, the amplitude comparator puts out a second signal. The auxiliary function generator 6 generates the discontinuous function E, which function has two values, one value being produced by the generator 6 when the generator 6 is receiving the aforementioned "first signal"

from the amplitude comparator 4, and the other, when the generator 6 is receiving from the amplitude comparator 4 the aforementioned "second signal." The output of the generator 6, which again may be an electrical quantity such as a voltage, is averaged by an averaging device indicated by the numeral 8. When voltages or currents are involved, such an averaging device can be constituted by a filter. The output of the averaging device 8 is simply the average value of the auxiliary function E and represents, when the proper magnitudes have been chosen for the two discrete values of E, the value $y_0$ of the function of $x$ corresponding to the value $x_0$ of the independent variable.

Figure 3:
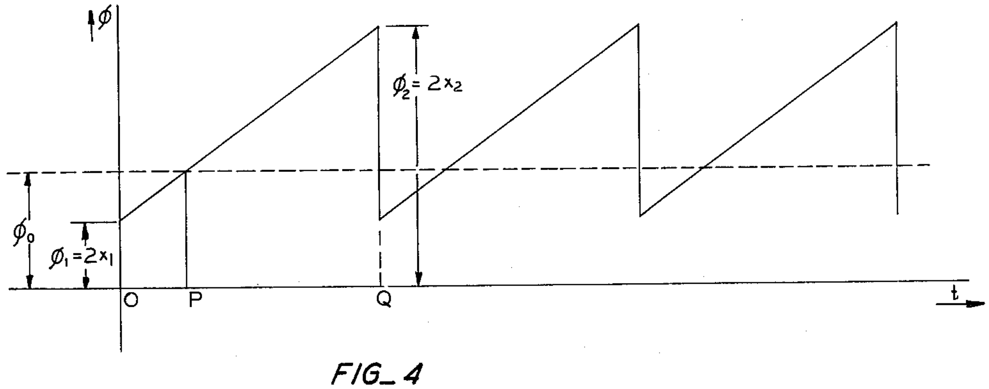
FIG. 3 is a graph illustrating a periodic time representation of a linear function having a 100% duty cycle.

ILLUSTRATIVE APPLICATIONS (1) Generation of $x=\frac{1}{2}\phi$: To illustrate the use of the method of this invention, let it be desired to generate the simple function $x=\frac{1}{2}\phi$ where $\phi_1 \leq \phi \leq \phi_2$ and correspondingly $x_1 \leq x \leq x_2$. The inverse function is $\phi=2x$. Applying the method of the invention, a periodic time representation of $\phi=2x$ is generated. One such periodic time representation is shown in FIG. 3 which happens to have effectively a 100% duty cycle. The amplitude of this time function is compared with a given value $\phi_0$ of the independent variable of the required function $x=\frac{1}{2}\phi$. Thereupon there is generated, as a result of the comparison, a discontinuous function $$E=\begin{cases}A_1 \text{ if } \phi \leq \phi_0.\\ A_2 \text{ if } \phi > \phi_0.\end{cases}$$

In this example $A_1$ is assigned the value $x_2$ and $A_2$ is assigned the value $x_1$. The auxiliary variable E over one cycle has the value $x_2$ during the time interval OP and has the value $x_1$ during the time interval PQ. The time average of E is then taken over the cycle and this time average will be the value $x_0$ of the dependent variable $x$ in the original functional relation corresponding to $\phi=\phi_0$. In FIG. 3 the scale chosen at random happens to have the following values: $x_1=\phi_1/2=1$; $x_2=\phi_2/2=4$; $OP=2$; $PQ=6$. Thus $A_1=4$; $A_2=1$; and the time average over one cycle is given by:

$$\frac{(4)(2)+(1)(6)}{2+6}=1\tfrac{3}{4}$$

That is, $x_0=1\frac{3}{4}$. To check the validity of the method, a measurement of $\phi_0$ is made and it is shown to be $3\frac{1}{2}$, which fulfills the equation $$x_0=1\tfrac{3}{4}=\tfrac{1}{2}\phi_0=(1/2)(7/2)$$

The generalized concept of the basic method of the invention applied to the generation of $x=\frac{1}{2}\phi$ can be seen from the following. In FIG. 3, let there be established on the $t$ axis a point P′ located between P and Q, such that $OP=P'Q$. Then, let the generation of the auxiliary variable take place in such a manner that E assumes the value $A_1=x_2$ during the interval P′Q and assumes the value $A_2=x_1$ during the interval OP′. Since, under this concept, the two values $A_1$ and $A_2$ of the auxiliary variable E have divided between them the total time interval OQ of the cycle of the time representation of the inverse functional relation in the same proportion that they did in the former case, when $A_1=x_2$ occupied the interval OP and $A_2=x_1$ occupied the interval PQ, then it is apparent that the average of E over the full cycle will be exactly the same as in the former case, and will equal $x_0$. In this instance, E has the value $A_1$ not during the interval of time, OP, when $\phi \leq \phi_0$ but during the interval of time $P'Q=OP$. Similarly, E has the value $A_2$ not during the interval of time PQ when $\phi > \phi_0$ but during the interval $OP'=PQ$. In actual practice with electronic equipment, it is often more convenient to use an arrangement exemplified by this latter case, wherein $A_1$ is generated during the interval P′Q. This is particularly true when the time representation of the inverse functional relation is symmetrical about its intercept on the abscissa axis such as the sine time function shown in FIG. 4. In such a case, the sum of the time representation of the inverse plus the given value of the independent variable changes sign at the point corresponding to P′ and this change of sign is useful to control the auxiliary function generator.

It is apparent that, in principle, the method of this invention can be practiced by generating only a single cycle of the time representation $\phi=2(kt+x_1)$. This will produce a precisely correct value $x_0$ of the function $x=\frac{1}{2}\phi$ so long as $\phi_0$ remains fixed during the single cycle.

If $\phi_0$ remains fixed over a plurality of cycles of the time representation, the average of E over all these cycles will still be precisely $x_0$. If E is averaged over many cycles, say some thousands of cycles, it will remain indetectibly different from $x_0$ even though the comparison of $\phi_0$ with the $\phi$ of the time representation be caused to cease at some instant prior to the exact completion of the last full cycle of the time representation. Since, in practice, it is commonly required to generate values of a dependent variable corresponding to numerous values of an independent variable it is, in practice, desirable to produce a periodic time representation of, e.g., $$\phi=2(kt+x_1)$$

so that there will always be at hand a contemporary cycle of this time function against which to compare an existing value of $\phi_0$ so as to generate promptly the auxiliary variable E and hence the ultimately desired value $x_0$. That is, the most usual case is the one where $\phi_0$ takes on various values as time progresses and does not remain fixed at one value.

If $\phi_0$ changes discontinuously to a new discrete value, say $\phi_0'$, the corresponding value $x_0'$ could be generated by merely generating one additional cycle of the time representation $\phi=2(kt+x_1)$ and performing the comparison and generation of E as in the first case. However, as just previously indicated, it would usually be desirable in conventional computers to produce a periodic time representation, i.e., a continuous repetition of the cycle, inasmuch as $\phi_0$ usually will change with time and, moreover, will usually change continuously with time. So long as the value of $\phi_0$ remains substantially fixed during one cycle of the time representation $\phi=2(kt+x_1)$, the generated function will be substantially $x_0$. Stated in other words, $\phi_0$ must for accuracy change at a much slower rate than the repetition rate of the periodic time representation. If, for example, $\phi_0$ were itself subject to a periodic variation, then, for accuracy, the frequency of the variation of $\phi_0$ should be much less than that of the periodic time representation $\phi=2(kt+x_1)$.

In practice, if 1/T is the repetition rate of the periodic time representation, 1/100 this rate or 1/100T is usually the maximum rate at which $\phi_0$ will be allowed to change to achieve practical computing accuracy. The slower the change in $\phi_0$, the more accurate will be the corresponding value of $x_0$ that is produced.

(2) Generation of $\theta=\text{arc sin } x$:

The inverse function is $x=\sin\theta$. The sine is an inherently cyclic function with limiting values of +1 and −1. A convenient range for consideration of the function $\theta=\text{arc sin } x$ is for $-\pi/2 \leq \theta \leq \pi/2$ since this corresponds to the range $-1 \leq x \leq 1$ yielding a sample extending over the entire possible range of the sine. The elementary obvious segment of a sine curve to be used for exhibiting a periodic time representation of the inverse function $x=\sin\theta$ would be the region where $\theta$ ranges from $-\pi/2$ to $+\pi/2$ and the equation of one cycle of such a representation would be $x=\sin(kt+\theta_1$ where $\theta_1=-\pi/2$ and $\theta_2=\pi/2$ so that $t$ varies from $t=0$ to $$t=\frac{\theta_2-\theta_1}{k}=\frac{\pi/2-(-\pi/2)}{k}=\pi/k$$

Figure 4:
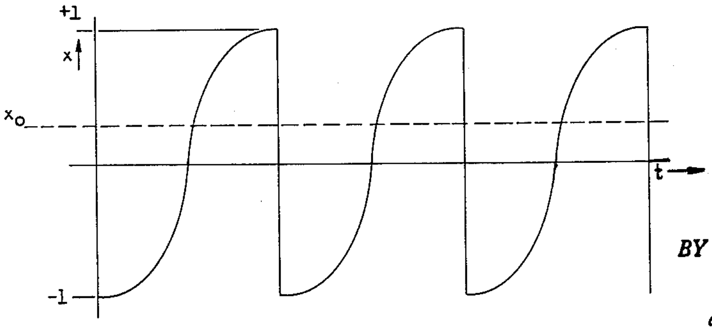
FIG. 4 is a graph illustrating a periodic time representation of the monotonic segment of the sine function having a 100% duty cycle.

The period of such a cycle is $\pi/k-0=\pi/k$. FIG. 4 shows a periodic time representation of this sine function using the elementary segment from $-\pi/2$ to $+\pi/2$ as the basic constituent. The generation of $\theta=\text{arc sin } x$ for any given value $x_0$ of $x$ is accomplished in accordance with the teaching of the invention viz. by comparing this segmentary time representation over a cycle with $x_0$ and generating the auxiliary function $$E=\begin{cases} \pi/2 \text{ if } \sin(kt+\theta_1)\leq x_0. \\ -\pi/2 \text{ if } \sin(kt+\theta_1)>x_0. \end{cases}$$

and then averaging E over the cycle. As mentioned in the preceding illustrative application, the comparison and averaging can just as well take place over a plurality of cycles of the time representation and will give the same accurate result. Also, if $x_0$ changes with time, the only practical application of the invention is by the use of a repetition of the cycle of the time representation and this repetition must for accuracy be at a rate much faster than the rate of change of $x_0$.

The generation of the wave form illustrated in FIG. 4, constituting a repetition of the segment of a conventional sine wave lying between $-\pi/2$ and $+\pi/2$, is certainly possible and can be accomplished by methods well known in the art as explained, for example, in the volume entitled "Waveforms," No. 19 of the Massachusetts Institute of Technology Radiation Laboratory Series published in 1949 by McGraw-Hill Book Co., New York. However, it is readily apparent that each full cycle of such a wave form constitutes one symmetrical half of the conventional full sine wave cycle lying between $-\pi/2$ and $3\pi/2$. It is further apparent that, because of the symmetry, the average value of E obtained by comparison of $x_0$ with that half of the conventional sine wave lying between $\pi/2$ and $3\pi/2$ would be identical with that obtained by comparison of $x_0$ with the segment of a sine wave lying between $-\pi/2$ and $\pi/2$. Therefore it is clear the same identical accurate result obtained by the use of the wave form of FIG. 4 can be achieved by using a full sine wave form. The full sine wave form is easily generated by means of a sine wave oscillator and would normally be less expensive to use than the wave form of FIG. 4.

The use of the entire full wave output of an ordinary sine wave oscillator to generate $\theta=\text{arc sin } x$ is now described. As previously noted, the inverse function is $x=\sin\theta$. Using conventional symbols, a periodic time representation of the inverse function employing the full wave is obtained by setting $\theta=\omega t$, where $t$=time and $\omega$=angular frequency. The function $x=\sin\omega t$ is, as noted, easily generated by means of a sine wave oscillator. Next, the output of the sine wave oscillator is compared with a given value of $x$, denoted by $x_0$; and as a result of this comparison, there is generated the auxiliary function $$E(\sin\omega t, x_0)=\begin{cases} \pi/2 \text{ if } \sin\omega t\leq x_0. \\ -\pi/2 \text{ if } \sin\omega t>x_0. \end{cases}$$

Because of the previously mentioned symmetry of a sine wave, the average of E over one cycle of $\sin\omega t$ will be the same as the average of E over that portion of the cycle lying between $\theta=-\pi/2$ and $\theta=\pi/2$ and furthermore the average of E over one cycle will be the same whether the cycle starts at $x=-1$ or $x=0$ or elsewhere. Moreover, if the average of E is taken while $x_0$ remains substantially unchanged during many cycles of $\sin\omega t$, the value of $E_{ave}$ will be substantially the same even though the comparison of $x_0$ with $x$ is terminated before the exact completion of an integral number of cycles of $\sin\omega t$.

Since $E(\sin\omega t, x_0)$ is a periodic function of period $2\pi/\omega$, its time average over a plurality of periods is the same as that over a single period. This average has already, in effect, been obtained in Example 3 above; and as before, there are three cases to consider: $x_0>0$, $x_0<0$ and $x_0=0$. For $x_0>0$ we have (see FIG. 5):

$$E_{ave}=\frac{\omega}{2\pi}\int_0^{2\pi/\omega}E\,dt$$

$$=\frac{\omega}{2\pi}\left[\int_0^{t_0}\pi/2\,dt+\int_{t_0}^{(\pi/\omega)-t_0}(-\pi/2)\,dt+\int_{(\pi/\omega)-t_0}^{2\pi/\omega}\pi/2\,dt\right]$$

where $$t_0=\frac{1}{\omega}\text{ arc sin } x_0$$

$$=\omega t_0=\text{arc sin } x_0$$

as required.

The cases $x_0<0$ and $x_0=0$ are treated in a similar manner, all leading to the result that $E_{ave}=\text{arc sin } x_0$, $-\pi/2\leq E_{ave}\leq\pi/2$. Thus, by appropriate filtering of $E(\sin\omega t, x_0)$ to obtain its time average, the value of arc sin $x_0$ is generated. Since $x_0$ was an arbitrary value of $x$ within its range of definition, the function $\theta=\text{arc sin } x$, $-\pi/2\leq\theta\leq\pi/2$ is obtained.

The physical schemes for carrying out the generation of $\theta=\text{arc sin } x$, as in all the following examples, are very numerous depending on the nature of the variables and the speed and accuracy requirements. One such scheme where the variables are voltages, as in electronic analogue computers, is shown schematically in FIG. 5. A voltage, representing $\sin\omega t$, supplied by any convenient sine wave generator, is applied to the terminal 10 of an amplitude comparator 12. The amplitude comparator 12 can be of any convenient form known in the art. Amplitude comparison and various types of comparators are described in the aforementioned volume Waveforms, especially in chapter 3 and chapter 9. A voltage representing $x_0$ is supplied to terminal 14 of the comparator. The output of the comparator 12 has two values: one if the comparator has found that $x\leq x_0$ and the other if $x>x_0$. The output of comparator 12 is fed to the generator 16 of the auxiliary function E. The output of comparator 12 causes auxiliary function generator E to select one or the other of its two input voltages representing $\pi/2$ and $-\pi/2$. It selects the former if $x\leq x_0$ and the latter if $x>x_0$. The output E of generator 16 is then a discontinuous function having the two values constituted by the voltages representing $\pi/2$ and $-\pi/2$. To average E this output is fed through a low pass filter, with cutoff below the frequency $\omega$, which effectively takes a time average of E so that the output at terminal 20 of the filter 18 is $E_{ave}$ which, as previously demonstrated, equals arc sin $x_0$.

Figure 5:
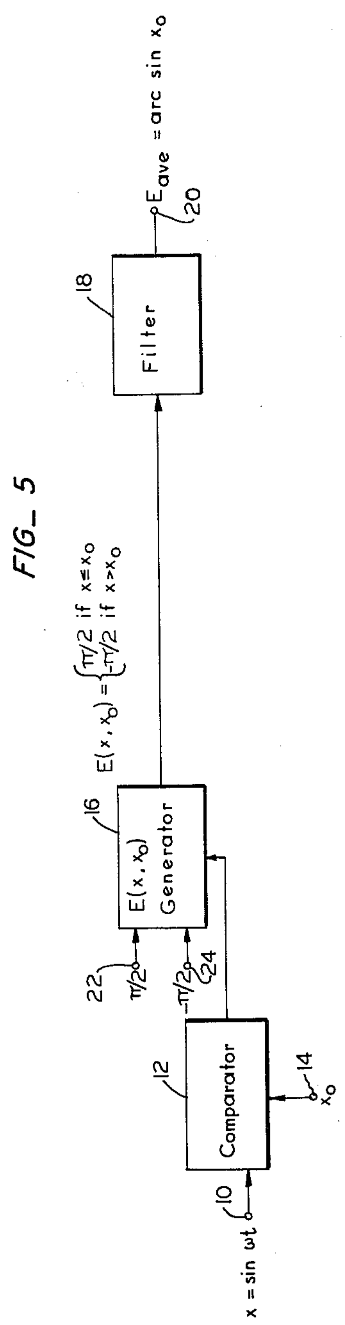
FIG. 5 is a block diagram of an apparatus for generating the arc sine function.

A compact electrical arrangement of the embodiment of FIG. 5 can be made by joining together in one unit the comparator 12 and the auxiliary function generator 16 wherein a polarized or differential relay is used, operated by the combination of the voltage at 10 and the voltage at 14 to make contact alternatively with a source of $\pi/2$ voltage or a source of $-\pi/2$ voltage. Mechanical comparators embodying the invention include any of the various forms of differential distance or angle detectors such as differential gears. Electronic comparators and switching circuits would preferably be used when the invention is used in a high speed computer.

Although for simplicity of explanation the input to terminal 10 of comparator 12 was shown as $\sin\omega t$, nevertheless in practice, particularly in conventional electronic computers, it is customary to use voltages of say 100 volts to represent the limiting values of the range of a variable. Thus, more generally, the input at terminal 10 would be shown as say $x'=A\sin\omega t$ where A might be 100 and $A\sin\omega t$ would be the actual instantaneous voltage at 10. In such a case $-A\leq x_0\leq A$. Similarly, the inputs at terminals 22 and 24 would more generally be designated as $k\pi/2$ and $-k\pi/2$. The actual voltage from filter 18 would then be $$E_{ave}=k \text{ arc sin} \left(\frac{x_0'}{A}\right)$$

However, multiplying factors are as readily removed as inserted by conventional procedures and the actual value of the function can thus always be extracted.

(3) Generation of $\theta$=arc cos $x$: Since —arc cos $x$=arc sin $x-\pi/2$, it suffices to add $-\pi/2$ to the arc sine function in order to obtain the —arc cosine function. This can be done in the circuit of FIG. 5 by adding $-\pi/2$ to the output of generator 16 or to the output of filter 18. If the arc cosine function is desired it can readily be produced in the conventional manner known in the art by feeding —arc cosine into an operational amplifier, the output of which will then be arc cosine. The range is $-\pi \leq \theta \leq 0$.

Of course $\theta$=arc cos $x$ can also be generated by the use of the method of the invention directly without recourse to a modification of the arc sine generator. This could be done by an apparatus similar to that of FIG. 5 wherein the inputs to comparator 12 would be cos $\omega t$ and $x_0$, and the inputs to generator 16 would be $\pi$ and 0 instead of $\pi/2$ and $-\pi/2$. It should be noted that cos $\omega t$ is, of course, identical in form to sin $\omega t$ and therefore is obtained from an ordinary sine wave oscillator, which can, as well, be called a cosine wave oscillator. The function then generated by generator 16 would be $$E=\begin{cases}0 \text{ if } x \leq x_0.\\ \pi \text{ if } x > x_0.\end{cases}$$

This is for the range $0 \leq \theta \leq \pi$.

(4) Generation of sin $\theta$ and cos $\theta$: This can be done for sin $\theta$ in one of two ways: (A) by placing the arc sine circuit of FIG. 5 in the feedback of an amplifier; or (B) by a direct application of the method of the invention. Both methods are easily adapted to the generation of cos $\theta$. Method A is illustrated in FIG. 6 and Method B is shown in FIG. 7.

Figure 6:
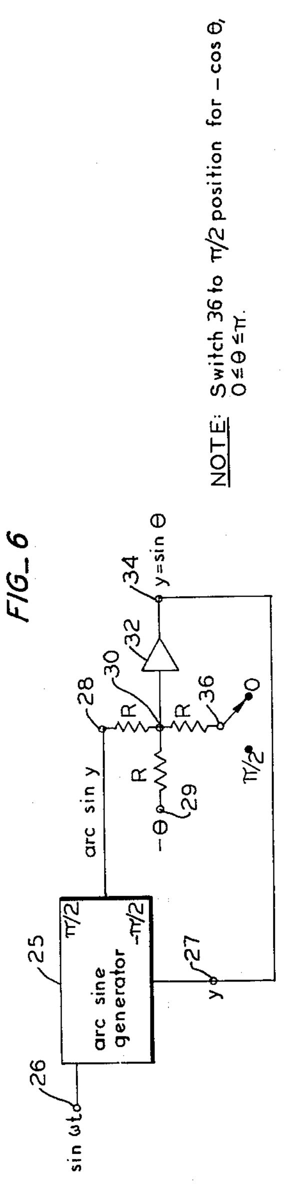
FIG. 6 is a schematic diagram of an apparatus for generating the sine and cosine functions using the apparatus of FIG. 5 in the feedback of an amplifier.

In FIG. 6 numeral 25 designates an arc sine generator identical to the entire assembly of FIG. 5 which receives sin $\omega t$ at one input terminal 26 and receives $y$ at its other input terminal 27 and yields arc sin $y$ at its output terminal 28. The output of the arc sine generator, and a voltage representing $-\theta$, applied at input terminal 29, are each fed through separate identical resistors R to the summing junction 30 of an operational amplifier 32. The output of this amplifier at 34 will be a quantity such that its arc sine equals $+\theta$. This quantity is then sin $\theta$. This arrangement is operative in the region from $-\pi/2$ to $\pi/2$. By throwing the switch 36 from the zero position to the position where $\pi/2$ is fed into summing junction 30 through another resistor R, of the same value as each of the aforementioned two resistors, the output of the apparatus becomes sin $(\theta-\pi/2)$ which equals —cos $\theta$. If cos $\theta$ is desired, it is a simple matter to feed the output at 34 into an amplifier to reverse its sign. It should be noted that the range of the device of FIG. 6 when used to generate a cosine function is from $0 \leq \theta \leq \pi$.

Figure 7:
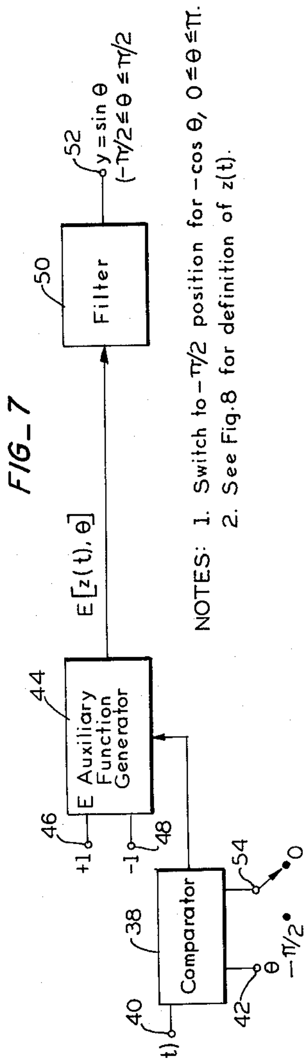
FIG. 7 is a block diagram of an apparatus for generating the sine and cosine functions using the basic method of the invention.

In FIG. 7 an apparatus using the direct application of the method of this invention is shown. A comparator 38 is supplied at terminal 40 with $z(t)$, a periodic time representation of the arc sine function of the variety shown in FIG. 8, for example. The voltage representing $\theta$, whose sine or cosine is ultimately to be produced, is fed into terminal 42. The comparator compares the two voltages at terminals 40 and 42 and then actuates auxiliary function generator 44, which is supplied with voltages at terminals 46 and 48 representing +1 and —1, so that generator 44 generates $$E=\begin{cases}+1 \text{ if } z(t) \leq \theta.\\ -1 \text{ if } z(t) > \theta.\end{cases}$$

The output of generator 44 is averaged by running it through a low pass filter 50 whose cutoff is below frequency $1/T$ but high enough to have little effect on the maximum frequency of change of $\theta$. The output of filter 50 at terminal 52 is then $y$=sin $\theta$ where $-\pi/2 \leq \theta \leq \pi/2$. By throwing switch 54 from the zero terminal to the $-\pi/2$ terminal, the independent variable input to the comparator becomes $\theta-\pi/2$ instead of $\theta$ and the device will be made to produce $y$=sin $(\theta-\pi/2)$=—cos $\theta$ where $0 \leq \theta \leq$. As previously mentioned —cos $\theta$ can easily be converted into cos $\theta$ by feeding it through an amplifier.

The periodic time representation of the arc sine function can be obtained in a variety of ways for use in Method B. Among these are:

(*a*) Harmonic synthesis of time sine functions which is simply the reverse of harmonic or Fourier analysis;

(*b*) Harmonic modification of a square wave which amounts to filtering out from a square wave (which contains practically all frequencies) such frequencies that those which remain produce the desired time function;

(*c*) Letting the $x_0$ input in FIG. 5 be a triangular wave form of amplitude +1 and —1 and of repetition rate much less than $\omega$. That is, $x_0$ can be varied as a triangular function of time and the output of terminal 20 of such a device as FIG. 5 would then be a periodic time representation of arc sin $x_0$.

Figure 8:
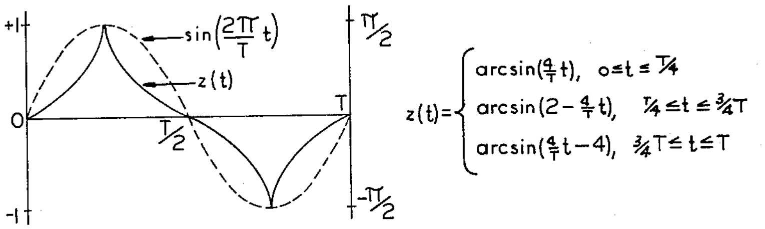
FIG. 8 is a graph illustrating a periodic time representation of the arc sine function produced from a sine wave.
Figures 9, 10:
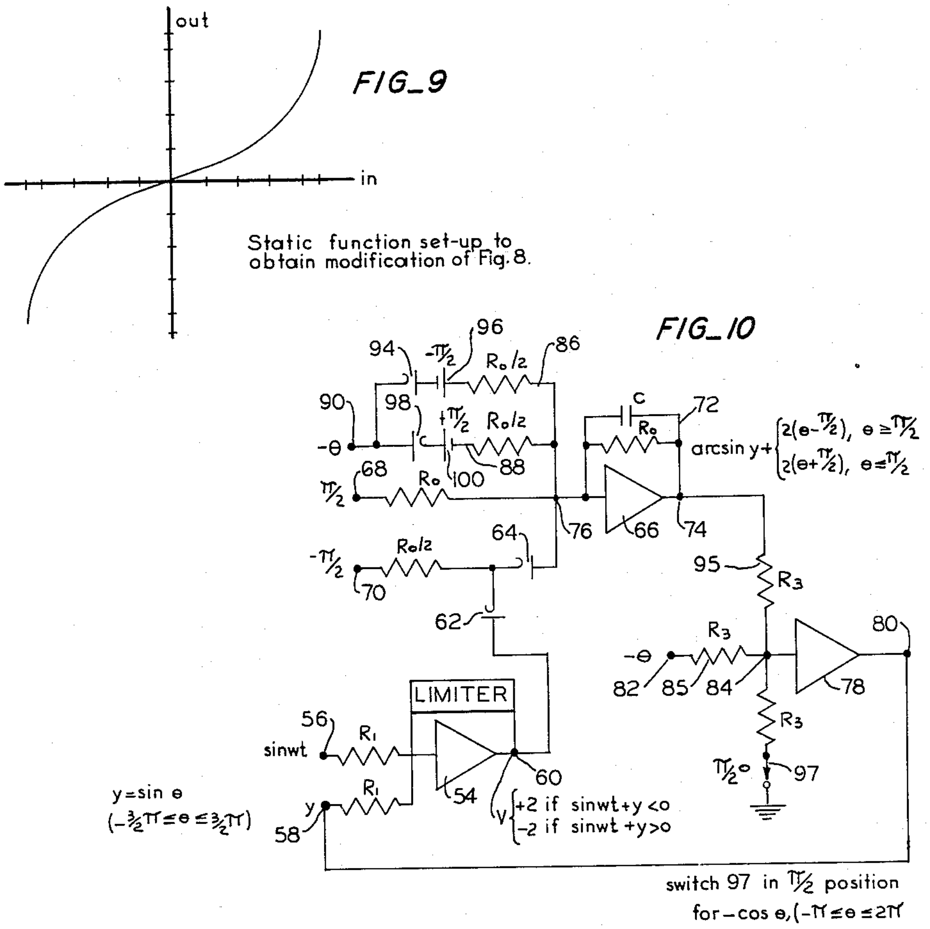
FIG. 9 is a graph illustrating the static function set-up used to modify a sine wave to produce the graph of FIG. 8.
FIG. 10 is a schematic diagram of an apparatus, using an arc sine generator in the feedback of an amplifier, for producing the sine function and cosine function for a range of angles extending over $3\pi$ radians.

(*d*) Direct modification of a periodic time function, such as sin $\omega t$, with a diode function generator. The last mentioned item is shown in FIG. 8 where sin $\omega t$ is being modified to a time function that gives the values of the arc sine between $-\pi/2$ and $\pi/2$ in a periodic manner. FIG. 9 shows the static function that would have to be set up on a diode or similar function generator to so modify sin $\omega t$. The use of diode function generators and the like in this manner to accomplish modification of functions is fully set forth in Korn and Korn op. cit. page 290 ff.

As previously noted, in the illustrative sine and cosine generators of FIGS. 6 and 7, the range of $\theta$ is $-\pi/2$ to $\pi/2$ for sin $\theta$ and 0 to $\pi$ for cosine $\theta$. These ranges can be extended by appropriate modification of the equipment when $\theta$ exceeds these ranges. One example of an actual circuit exhibiting such a modification is shown in FIG. 10. This circuit can be said to represent essentially an actual circuit exemplifying the schematic arrangement of FIG. 6 plus the modification employed to extend the range of $\theta$ to from $-3\pi/2$ to $3\pi/2$ for sin $\theta$ and to $-\pi$ to $2\pi$ for cosine $\theta$. The circuit comprises a comparator including an operational amplifier 54 having two input terminals 56 and 58 into which are fed, respectively, sin $\omega t$ and $y$ for comparison. The limiter connected to amplifier 54 is arranged to produce at the output terminal 60 a discontinuous voltage function having only two values, say +2 if sin $\omega t+y<0$, and —2 if sin $\omega t+y>0$. This voltage is chosen as being sufficient to cause diode 62 either to conduct or not to conduct. The circuit further comprises an auxiliary function generator and an averaging device for its output including diodes 62 and 64, operational amplifier 66 with input terminals 68 and 70, filter circuit 72 and output terminal 74.

If sin $\omega t > -y$, the plate of diode 62 is made negative and therefore diode 64 will conduct and the net voltage appearing at terminal 76 will be that due to $\pi/2$ from terminal 68 minus, from terminal 70, $\pi/2$ increased by virtue of $R_0/2$ to $-\pi$ so that the net effect at terminal 76 will be that of $-\pi/2$. When sin $\omega t < -y$, the net voltage at terminal 76 will be that due to effectively $+\pi/2$. The output at 76 is averaged by the filter circuit 72 so that arc sin $y$ appears at terminal 74.

To produce the sine of $\theta$, it suffices to embody the afore-described arc sine generator in the feedback of an amplifier circuit in the manner of FIG. 6. In FIG. 10 the output 74 is placed in the feedback of operational amplifier 78, whose output at terminal 80 provides the $y$ to be fed into the arc sine generator at terminal 58. $\theta$, whose sine it is desired to generate, has its negative applied at terminal 82 and joins the output of the arc sine generator at summing junction 84 serving as the input source for amplifier 78. Since the entire monotonic section of the sine curve is represented by the portion lying between $\theta=-\pi/2$ and $\theta=\pi/2$, the aforedescribed circuit will generate accurately the value of sin $\theta$ for any $\theta$ lying within these limits. As thus far described, the construction and operation of the circuit is substantially identical with that of FIG. 6. In the circuit of FIG. 6, and its counterpart in FIG. 10, if the value of the independent variable input $-\theta$ is allowed to exceed the limits $\pi/2$ and $-\pi/2$, then the output of the device, i.e., terminal 34 in FIG. 6 or terminal 80 of its counterpart in FIG. 10, would go very highly negative or positive until the amplifier saturates and thus gives an erroneous reading. The reason for this erroneous reading is that the maximum voltage which the device, as thus far described, can supply at terminal 74 in FIG. 10, for example, is $-\pi/2$ or $+\pi/2$ and this is sufficient to balance at junction 84 only $-\pi/2$ or $+\pi/2$ originating at terminal 82. If the difference between these two voltages appearing at 84 is not very close to zero, the tremendous amplification of amplifier 78 causes its output at 80 to rise until the amplifier saturates.

To extend the limits of the function would require some modification which would cause the output at terminal 80, which is, for example say +1 when $\theta$ is 90°, to decrease when $\theta$ increases to, say 93°, until it reaches the same value that it had when $\theta$ was 87°, since sin (90°+3°) =sin (90°−3°). In other words, the circuit of FIG. 6 and its counterpart in FIG. 10 can be made to produce a correct value for the sine of $\theta$ with $\theta$ equal to, say 93°, if the effective $\theta$ input were made 87° or in general if the effective input were reduced to a value $\theta-2(\theta-\pi/2)$. This is accomplished in FIG. 10 by adding the two additional branches 86 and 88 to be used under appropriate circumstances to contribute to the voltage at terminal 76.

Figures 11, 12:
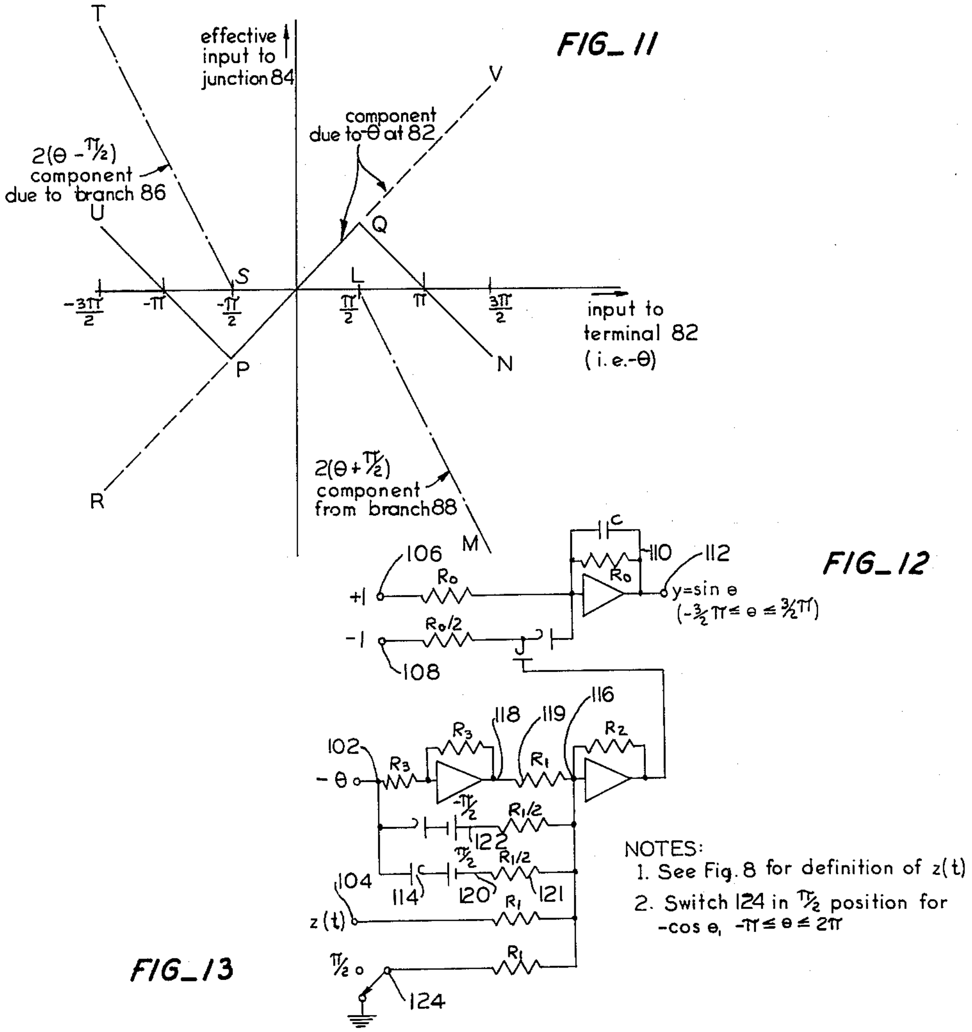
FIG. 11 is a graph illustrating the operation of the means in FIG. 10 for extending the usable angular range.
FIG. 12 is a schematic diagram of an apparatus using the basic method of the invention for generating the sine and cosine functions with means extending the angular range over $3\pi$ radians.

The operation of the circuit can easily be understood by reference to FIG. 11 in which the solid line representation is a graph of effective input to junction 84 in FIG. 10 versus $-\theta$, which latter is applied to terminal 82. As the input of $-\theta$ at terminal 82 goes from $-\pi/2$ to $\pi/2$ the effective input at junction 84 must go from $-\pi/2$ to $\pi/2$ and it does so, as illustrated in FIG. 11 by the line segment PQ, by virtue of the operation of the circuit heretofore described as the counterpart of FIG. 6. As $\theta$ increases beyond $\pi/2$ and the input $-\theta$ at terminal 82, designated as $-\theta_{82}$, becomes more negative than $-\pi/2$, it is required for the effective input at 84, designated as $-\theta_{84}$, to decrease in absolute magnitude to the value given by the equation $-\theta_{84}=-\theta_{82}+2(\theta_{82}-\pi/2)$. The reason for this can be seen from an example using actual numbers. When say $-\theta_{84}=-87°$, the output at terminal 80 is sin 87°. When $-\theta_{84}=-90°$, the output at terminal 80 is sin 90°. However, if $-\theta_{84}$ should be allowed to become more negative to say −93°, then the system, which is built to work only within the limits $-\pi/2$ to $\pi/2$, cannot handle the −93° voltage and, so to speak, goes berserk yielding an output at 80 representing saturation of amplifier 78. But, observing that sin 93°=sin 87°, it is apparent that if, when $-\theta_{82}=-93°$, $-\theta_{84}$ can be made equal to −87°, then the apparatus, which is fully capable of handling a voltage of −87° at terminal 84 without going berserk, will yield at terminal 80 a voltage equal to sin 87°. This latter, of course, is numerically equal to sin 93° so that the apparatus is, in effect, handling a voltage input at 82 representing $\theta>\pi/2$.

It should be noted that the general requirement, previously stated, that for $\theta>\pi/2$, $$-\theta_{84} \text{ must}=-\theta_{82}+2(\theta_{82}-\pi/2)$$

is represented in the preceding numerical example thus:

$$-\theta_{84}=-93°+2(93°-90°)=-87°$$

To accomplish this requirement means contributing, at the time when $\theta>\pi/2$, a component at 84 which will add, to the component at 84 due to $-\theta_{82}$, the effect of $$2(\theta_{82}-\pi/2)$$

applied through an input resistor equal in size to 85. This added component arrives from the network comprised of branches 86 and 88. The same voltage $-\theta$ applied to terminal 82 is always simultaneously applied to terminal 90. When $-\theta$ at terminal 90 is more negative than $-\pi/2$, the potential of the cathode of diode 94 is lowered below that of its plate and hence diode 94 conducts, causing a current to flow in branch 86 whose magnitude is proportional to $-\theta-(-\pi/2)$ divided by $R_0/2$. This, in effect, contributes at junction 76 a potential of $2(-\theta+\pi/2)$ which, in passing through amplifier 66, changes its sign and, since resistor 95 equals resistor 85, appears at terminal 84 as, effectively, $2(\theta-\pi/2)$, compared to the $-\theta$ at the same terminal contributed from terminal 82. The net or effective input, then, at terminal 84 upon initiation of the operation is $$-\theta+2(\theta-\pi/2)=\theta-\pi$$

If, as in the aforementioned example, $\theta=93°$, then the net effective input at terminal 84 would correspond to $$93°-\pi=-87°$$

a magnitude which is within the limits of $-\pi2$ to $+\pi/2$ under which the circuit is capable of giving correct results. The production of the proper effective input at terminal 84 for the region $\pi/2\leqq\theta\leqq3\pi/2$ is shown graphically in FIG. 11 by the dotted line segment PR, representing the contribution from $-\theta_{82}$; the dash-dot line segment ST, representing the contribution from branch 86 equal to $2(\theta_{82}-\pi/2)$; and the solid line segment PU representing the sum of the two contributions at terminal 84.

An analogous situation occurs with conduction in branch 88 when $-3\pi/2\leqq\theta<-\pi/2$. This is shown graphically in FIG. 11 by line segments QV and LM which add to produce QN.

This circuit can be used, by throwing switch 97 to the $\pi/2$ position, for generating −cos $\theta$ for the limits $$-\pi\leqq\theta\leqq2\pi$$

But, of course, it is operable only within these limits for the −cos $\theta$ (and $-3\pi/2\leqq\theta\leqq3\pi/2$ for the sine) for the reason that these limits are necessary, with this circuit, to maintain the effective net input at 84 between $-\pi/2$ and $\pi/2$. If $\theta$ should exceed $3\pi/2$, e.g., should be 271°, then the net effective input at 84 would be $$\theta-\pi=271°-180°=91°$$

which is beyond the operating limits of the circuit. However, further extension beyond the range $-3\pi/2$ to $3\pi/2$ for the sine and $-\pi$ to $2\pi$ for the cosine is, of course, possible using the illustrated principle, i.e., by energizing appropriate circuits whenever the absolute magnitude of $\theta$ exceeds $3\pi/2$, $5\pi/2$, etc., so that the effective input at 84 is always maintained in the range $-\pi/2$ to $+\pi/2$.

The circuit of FIG. 7 using Method B can also be modified to extend the range of $\theta$. FIG. 12 illustrates such a modification showing one particular embodiment. When operating in the range of $-\pi/2\leqq\theta\leqq\pi/2$, the circuit compares $\theta$ applied at terminal 102 with the time representation $z(t)$ of the arc sine function applied at terminal 104 and, on the basis of the comparison, selects, in a manner similar to the operation of the circuit of FIG. 10, either +1 or −1 from terminals 106 or 108 as the value of the auxiliary variable. The auxiliary variable is averaged by the filter 110 yielding sin $\theta$ at output terminal 112. If $\theta$ exceeds $\pi/2$, diode 114 conducts and produces as the effective input at terminal 116 the sum of $$-\theta+2(\theta-\pi/2)=\theta-\pi$$

the first term on the left hand side being due to branch 118 and the second term being due to branch 120. This is so because resistor 119 is twice as large as resistor 121. So long as $\theta\leqq3\pi/2$, the quantity $\theta-\pi$ effectively applied at 116 remains within the $-\pi/2$ to $\pi/2$ range of effective inputs within which the circuit gives correct results.

Similarly, when $\theta<-\pi/2$ branch 122 conducts and the circuit yields correct results for $\theta\geqq-3\pi/2$. If switch 124 is swung to the $\pi/2$ terminal the circuit operates to generate $-\cos\theta$ for $-\pi\leqq\theta\leqq2\pi$. As indicated in the discussion of FIG. 10, the circuit of FIG. 12 can, of course, be extended using the illustrated principle beyond the range $-3\pi/2\leqq\theta\leqq3\pi/2$ for the sine and $-\pi\leqq\theta\leqq2\pi$ for the —cosine.

GENERATION OF SINE $\theta$, COS $\theta$ WITH UNLIMITED ANGULAR RANGE

It is often important in problems using angles to have an unlimited angular range when generating sine or cosine functions. The circuits of FIGS. 6, 7, 10, and 12 can be adapted to this requirement through the use of an auxiliary circuit. This auxiliary circuit makes use of $d\theta/dt$ to produce an oscillation that sweeps through the restricted angular ranges of the sine and cosine generators (e.g., for one sine generator the range would be from $-\pi/2$ to $+\pi/2$) at a rate proportional to $d\theta/dt$. When $d\theta/dt$ is constant this oscillation becomes an isosceles triangular wave. The circuit, when used for example to supply a sine generator, will then supply the sine generator with an input $\theta$ which always lies between $-\pi/2$ and $+\pi/2$ and at each instant has a value such that its sine is equal to the sine of the actual angle $\theta$ (which is the actual machine variable) at that instant. That is, the circuit in a sense performs a function which results in the mathematical equivalent of converting the actual $\theta$, no matter how large it may be, into an angle in either the first or fourth quadrants having an equivalent sine. The circuit performs this function without receiving (after initiation of its operation) any actual $\theta$ input but by receiving merely actual $d\theta/dt$ input which latter it integrates with respect to time in order to be able to sense increments of actual $\theta$. A preferred embodiment of the auxiliary circuit is shown in FIG. 13.

Figure 13:
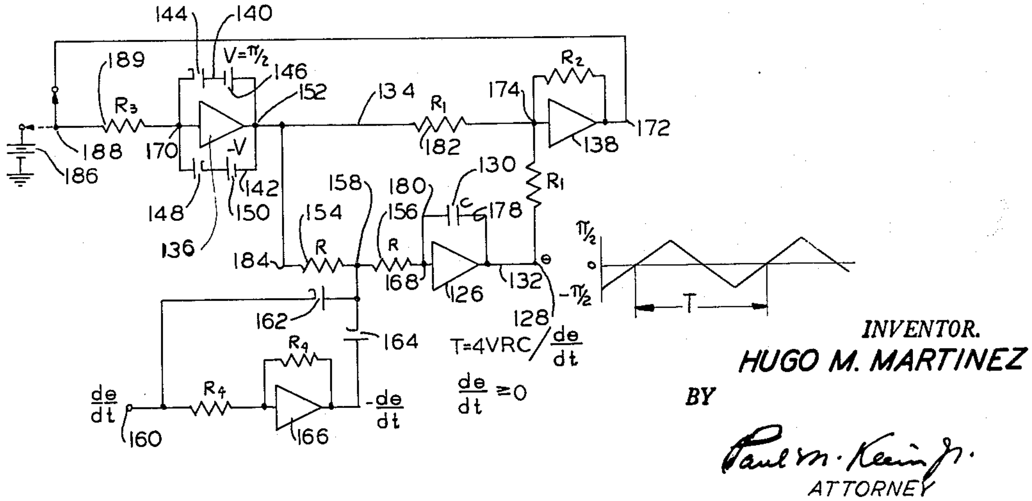
FIG. 13 is a schematic diagram of an apparatus used for extending without limit the angular range of sine and cosine generators.

The circuit of FIG. 13 comprises an operational amplifier 126 whose output at terminal 128 will ultimately be the desired $\theta$ whose negative would be fed into, for example, terminal 29 of the sine generator of FIG. 6 or the like. The amplifier 126 is shunted by a condenser 130. The capacitor-shunted amplifier 126, 130 is located in one branch 132 of a parallel circuit including another branch 134, which parallel circuit is connected in series with a pair of operational amplifiers 136 and 138. Amplifier 136 is shunted by alternatively operating branches 140 and 142, the former branch including a diode 144 and a voltage source such as a battery 146 of value $\pi/2$, and the latter branch including a diode 148 and a voltage source such as a battery 150 of such a value as to produce at terminal 152 a voltage of $-\pi/2$ when branch 142 is conducting.

Branch 132 includes two resistors 154 and 156 of equal value at whose junction 158 is connected the output of a circuit yielding angular rate of change. This angular rate circuit receives at its input terminal 160 the quantity $d\theta/dt$, the time rate of change of the actual machine variable $\theta$, which it can apply to junction 158 when diode 162 is conducting. Alternatively, when diode 164 is conducting, the angular rate circuit can apply $-d\theta/dt$ to junction 158, the negative being obtained by simply passing $d\theta/dt$ through the amplifier 166.

To initiate the operation of the circuit of FIG. 13, both $\theta$ and $d\theta/dt$ must be initially available but, after initiation of the operation, all that is needed is $d\theta/dt$ and no further need exists for information as to the value of the actual machine variable $\theta$ to enable the device to continue functioning. The operation of the device proceeds as follows. At time $t=0$, $\theta$, the quantity appearing at terminal 128, is assumed to be $\theta(0)$. This value is established by applying, either automatically or manually, a voltage across capacitor 130, this being the initial value of the actual machine variable $\theta$. This voltage can be applied by simply placing a battery of the correct value across the terminals of condenser 130, it being remembered that the potential at the summing junction 168 of the operational amplifier 126 is always substantially zero or ground. At the same instant that the initial value of $\theta$ is applied across condenser 130, $d\theta/dt$ is connected to terminal 160. At time $t=0+\delta$, the battery imposing $\theta(0)$ across condenser 130 is removed. While the battery was in position across condenser 130, the potential across the condenser was necessarily maintained constant. Upon removal of the battery, however, the amplifier 126 with its associated condenser acts as an integrator and begins to integrate its input voltage which is applied to one or both of its input resistors 154, 156. Assuming that $0\leqq\theta(0)<\pi/2$, it will be intended for the integrator to add to the initial value $\theta(0)$ appearing at 128 the increment represented by the integral of $d\theta/dt$ over a period of time until the value of $\theta$ at 128 reaches $\pi/2$. To insure that the initial operation is started in the right direction to perform this addition, it is required that, at the start of the operation, a positive input should exist at input terminal 188 to the amplifier 136. This can easily be accomplished by throwing the switch 188 to a source such as 186 of positive potential, which could be for example merely one volt, at the instant of the start of the operation and then throwing it back into the solid line position very rapidly, using a make-before-break switch if desired. The reason for applying an initial positive potential at 188 can be seen from the following analysis.

With, say, +80 at 128 from the starting battery applied across 130, there would be experienced at summing junction 174 the effect of +80 from 128 plus the effect transmitted from terminal 152. At 152 there will, however, be a voltage of $-\pi/2$ produced by virtue of the following sequence of events. When terminal 188 is connected to the positive battery source 186, the output of amplifier 136 at 152 will be negative. By virtue of battery 150 and diode 148, it is held at a negative level of $-\pi/2$. Therefore, at summing junction 174 there will be felt the effect of, say, +80 from 128 combined with —90 from 152 giving a net negative effect at 174 which will emanate with a change of sign as a positive voltage at 172. This positive voltage at 172 is fed, through resistor 189, into summing junction 170, thus maintaining the circuit in a stable state since the positive starting voltage at 188 from the battery 186 was precisely the sign required to produce a positive voltage at 172 to be fed into 188 so that the device will be self-maintaining.

With $-\pi/2$ appearing at junction 152, as just described, the potential at junction 158 will be $-\pi/4$ since resistors 154 and 156 are equal and the potential at 168, as previously indicated, is substantially zero. $d\theta/dt$ is assumed to have a value between zero and $\pi/4$. The presence of $-\pi/4$ at junction 158 therefore causes diode 164 to conduct, thereupon clamping the voltage at junction 158 at the level of $-d\theta/dt$ which might be at, say, —40 volts. With —40 volts at terminal 158, the integrating amplifier 126 will integrate this voltage continuously as long as it is applied at terminal 158, resulting in an increase in the positive voltage at terminal 178 and hence, at 128. When the voltage at 128 has reached $\pi/2$, a change will occur. As soon as the voltage at 128 exceeds ever so slightly $\pi/2$, the net effect at junction 174 will flip from negative to positive. For example, +91 at junction 128 combined with $-\pi/2$ from junction 152 will yield a net effect at 174 of +1. This positive voltage at 174 changes its sign by passing through amplifier 138, and the voltage at 172 will then be negative. A negative voltage at 172 fed into junction 170 will produce a positive voltage at 152, which positive voltage will be fixed at $\pi/2$ by the limiting effect of branch 140 having battery 146 and diode 144.

As soon as $+\pi/2$ appears at 152 this will tend to produce at junction 158 a potential of $+\pi/4$ which instantly stops diode 164 from conducting and causes diode 162 to conduct, transmitting to junction 158 the voltage $d\theta/dt$ originating at terminal 160. Assuming, as previously, stated, that $$\frac{d\theta}{dt}=+40$$

merely for example, this positive voltage at 158 will appear as a negative voltage at 132, having changed its sign by passing through amplifier 126, and this negative voltage will be integrated by the integrator amplifier 126, thus reducing the positive potential at terminal 178 from $\pi/2$ down through zero until it reaches $-\pi/2$. When the $\theta$ output at 128 attempts to go more negative than this $-\pi/2$ value, another change occurs, the reverse of that previously explained. That is, the say $-91$ at 128 overbalances the $+\pi/2$ at 152 and thus produces a net negative voltage at 174 which emanates as a positive voltage at 172 and enters junction 170 as a positive voltage causing a negative voltage to appear at 152, which negative voltage is fixed at $-\pi/2$ by limiter 142. The $-\pi/2$ voltage at 152 tends to produce a potential at 158 of $-\pi/4$ which stops the conduction of diode 162 and starts again the conduction of diode 164, thus clamping terminal 158 at the potential $-d\theta/dt$. The circuit is now back to the same type of condition that obtained at the original start where the output at 132 was positive. This positive voltage is integrated and thus raises the potential at 178 and 128 from $-\pi/2$ through zero to $+\pi/2$, at which time the sequence of events repeats itself and then goes on indefinitely repeating.

It should be noted that the integrator circuit is a linear integrator which causes the voltage across condenser 130, which is to say the output $\theta$ at 128, to rise and fall linearly with time between the limits of $-\pi/2$ and $+\pi/2$. Assuming that $d\theta/dt$ is a constant, the graph of $\theta$ output at 128 versus time will be the triangular wave shown in FIG. 13. From the foregoing, it is apparent that the circuit of FIG. 13 produces an output $\theta$ at terminal 128 which lies always between $-\pi/2$ and $+\pi/2$ and will be of such a value that its sine will always equal the sine of the actual machine variable $\theta$ as the machine variable $\theta$ increases indefinitely from any initial value lying between $-\pi/2$ and $+\pi/2$. The circuit accomplishes this by being supplied only initially at terminal 178 with only the initial value of the actual machine variable $\theta$ and by being supplied continuously at terminal 160 with $d\theta/dt$. When the actual machine variable $\theta$ exceeds $\pi/2$, there is no longer any potential appearing in the circuit of FIG. 13 which equals the actual value of the machine variable $\theta$.

What is accomplished mathematically will appear from the following analysis. The initial value of the machine variable $\theta_m$ lies between $-\pi/2$ and $\pi/2$. At the start the $\theta$ output at 128 is $\theta_0=\theta_m$. $\theta_m$ is assumed to increase. As $\theta_m$ increases beyond $\pi/2$, $\theta_0$ begins to decrease, the relation being $\theta_0=\pi/2-(\theta_m-\pi/2)$. This relation holds until $\theta_0$ reaches a value $-\pi/2$ at which time $\theta_m$ will have reached $2(\pi/2)=\pi$. At this instant, the relation changes so that $\theta_0=\pi/2$ plus the increment of $\theta_m$ in excess of $\pi$, thus: $\theta_0=-\pi/2+(\theta_m-\pi)$. This relation continues until $\theta_m$ reaches $4(\pi/2)=2\pi$ at which time $\theta_0$ will be $-\pi/2+(2\pi-\pi)=\pi/2$. When this condition is reached the relation changes again in similar fashion, thus always keeping $\theta_0$ within the range of $-\pi/2$ to $+\pi/2$. The method by which this is accomplished is by integrating $d\theta_m/dt$ with respect to time. Across condenser 130 there is initially applied $\theta_m=\theta(0)$ which, at the start, $=\theta_0$. Thereafter there is added to the initial voltage across the condenser $$\int_{\theta_m=\theta(0)}^{\theta_m=\theta(t)}\frac{d\theta_m}{dt}dt$$

so that at any instant its voltage=

$$\theta_m(0)+\int_{\theta_m=\theta(0)}^{\theta_m=\theta(t)}\frac{d\theta_m}{dt}dt$$

until this sum reaches $\pi/2$. Then from $\theta_0=\pi/2$ there is subtracted $$\int_{\theta_m=\pi/2}^{\theta_m=\theta(t)}\frac{d\theta_m}{dt}dt$$

during the interval where $\theta_m$ varies from $\pi/2$ to $\pi$ thus $$\theta_0=\pi/2+\int_{\theta_m=\pi/2}^{\theta_m=\theta(t)}\frac{-d\theta_m}{dt}dt$$

where $\pi/2\leq\theta(t)\leq\pi$, etc., etc.

It is of some interest to compare this process with that of FIG. 10. In FIG. 10, for the interval $$-\pi/2\leq\theta_m\leq\pi/2$$

then $\theta_0=\theta_m$. This compares with FIG. 13 where, for the same interval, $$\theta_0=\theta_m(0)+\int_{\theta(0)}^{\theta_m}d\theta_m$$

which reduces to $\theta_0=\theta_m(0)+[\theta_m-\theta(0)]=\theta_m$. For the interval $\pi/2\leq\theta_m\leq 3\pi/2$, then $\theta_0=\theta_m-2(\theta_m-\pi/2)$. This compares with FIG. 13 where $\theta_0=\pi/2-(\theta_m-\pi/2)$. Numerically, of course, the two separate latter expressions for $\theta_0$ are identical and $=\pi-\theta_m$.

As previously noted, when $d\theta/dt$ is a constant, the output of the auxiliary circuit of FIG. 13 at terminal 128 is an isosceles triangular wave having extreme values $-\pi/2$ and $+\pi/2$. Such a wave is shown in the graph adjacent terminal 128. As previously stated, the auxiliary circuit, of which FIG. 13 is a preferred embodiment, is used in conjunction with the circuits of FIGS. 6, 7, 10 and 12. For use with the circuit of FIG. 6, for example, the output of terminal 128 in FIG. 13 would have its sign reversed, as by feeding it through an operational amplifier, and then would be fed in the form of $-\theta$ to terminal 29 in FIG. 6. Similarly, when used in conjunction with the circuit of FIG. 7, the output of terminal 128 in FIG. 13 would be fed to terminal 42 in FIG. 7. In like manner, the negative of the output at terminal 128 in FIG. 13 would be fed into terminal 82 in FIG. 10 and the unreversed output of terminal 128 would be fed directly to terminal 102 in FIG. 12.

Figure 14:
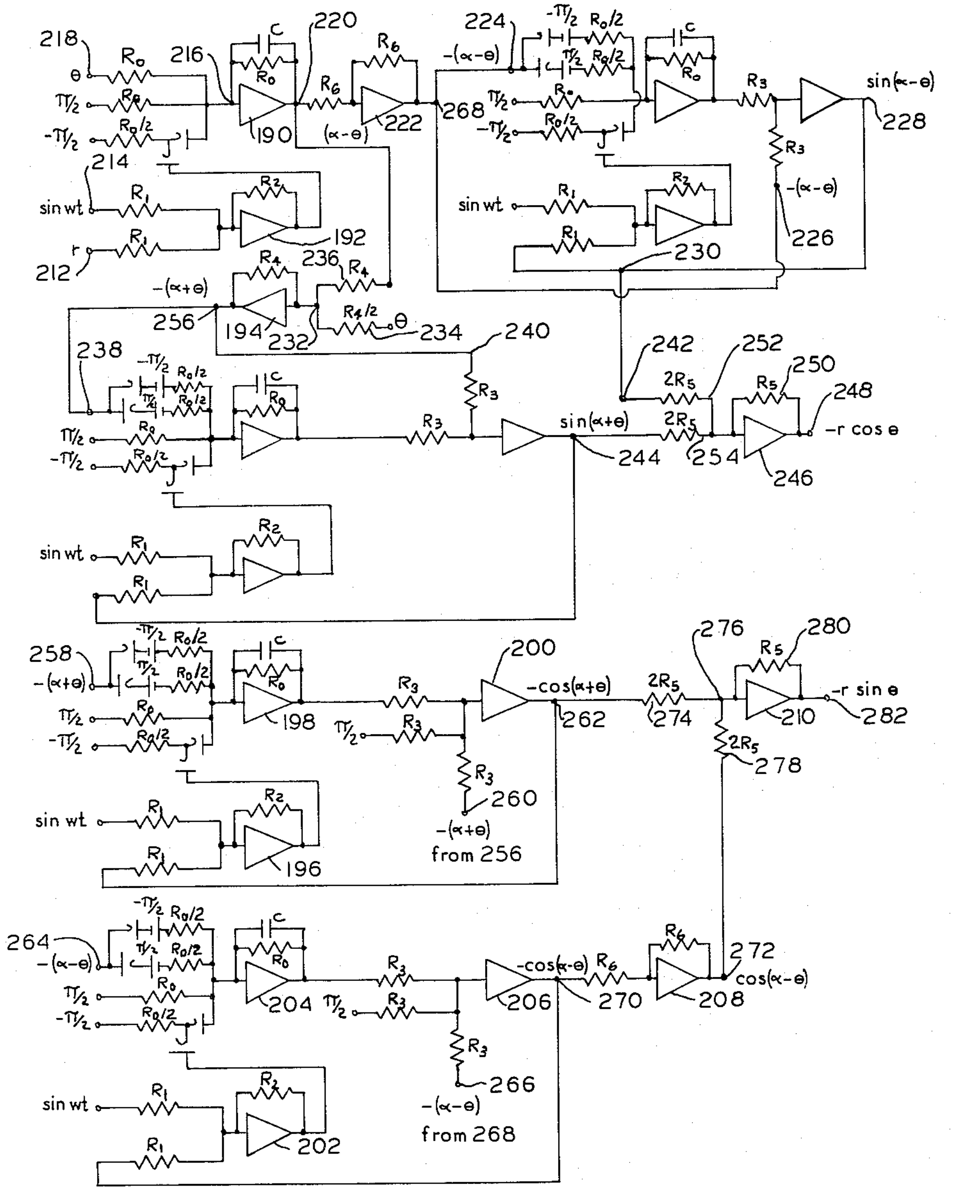
FIG. 14 is a schematic diagram of an apparatus for accomplishing polar to rectangular transformations using arc sine generators in the feedback of amplifiers.

(5) Polar to rectangular transformations (resolving): Either of the above Methods A and B for producing $\sin\theta$, $\cos\theta$ can be adapted to produce $x=r\cos\theta$, $y=r\sin\theta$. Method A is adapted by making use of the relations $$\sin\alpha\cos\theta=\tfrac{1}{2}[\sin(\alpha+\theta)+\sin(\alpha-\theta)]$$
$$\sin\alpha\sin\theta=\tfrac{1}{2}[\cos(\alpha-\theta)-\cos(\alpha+\theta)]$$

and letting $\alpha=\arcsin r$ so then $r=\sin\alpha$. Thus, arc sin $r$ is first obtained with the circuit of FIG. 5, summed and differenced with $\theta$ to produce $\alpha+\theta$ and $\alpha-\theta$; the sines and cosines of these sums and differences are taken, and then combined according to the above relations. FIG. 14 illustrates one embodiment of a circuit for generating $-r\cos\theta$, and $r\sin\theta$. It should be noted that the initial transformation of $\alpha=\arcsin r$ permits positive or negative values of $r$, so that actually the circuit of FIG. 14 is a means of generating $\cos\theta$ and $\sin\theta$ *and* multiplying both by *any* variable. In fact, if $\theta$ is obtained as the arc sine of one variable and $\alpha$ as the arc sine of another, then amplifiers 190, 192, 194, and 196 through 210, plus two more for obtaining $\theta$ as an arc sine, yield a four quadrant multiplier made up of a total of 13 amplifiers.

The circuit of FIG. 14 comprises a slightly modified arc sine generator constituting a particular embodiment of the diagrammatic arc sine generator of FIG. 5. The quantity $r$ is fed into the input terminal 212 and compared with $\sin\omega t$ fed into terminal 214. The comparator circuit including amplifier 192 selects either $\pi/2$ or $-\pi/2$ as the result of the comparison and feeds this selection into the summing junction 216 of amplifier 190 for the purpose of averaging the auxiliary variable. The modification of the arc sine generator consists of the inclusion of $\theta$ fed into terminal 218 so that the output at junction 220 of the amplifier 190 is the quantity $\alpha-\theta$. This resolver circuit further includes means for producing sin $(\alpha-\theta)$ and sin $(\alpha+\theta)$ from the quantity $\alpha-\theta$ just described, for use in the first aforementioned trigonometric identity.

To produce sin $(\alpha-\theta)$, the quantity $(\alpha-\theta)$ is fed through amplifier 222 to reverse its sign and is then fed through terminals 224 and 226 into an extended range sine generator identical to the circuit of FIG. 10 which yields at its junctions 228 and 230, sin $(\alpha-\theta)$.

To produce the sin $(\alpha+\theta)$, the quantity $(\alpha-\theta)$ from terminal 220 is effectively added at junction 232 to $2\theta$ (by virtue of the use of resistor 234 having half the value of resistor 236), and this sum, namely $\alpha+\theta$, is fed through amplifier 194 to reverse its sign and then fed at terminals 238 and 240 into an extended range sine generator again identical to that of FIG. 10. With sin $(\alpha-\theta)$ being fed into terminal 242 and sin $(\alpha+\theta)$ being fed into terminal 244 of operational amplifier 246, the output at terminal 248 is, by virtue of the ratio of feedback resistor 250 to each of the input resistors 252 and 254

$$-\tfrac{1}{2}[\sin(\alpha+\theta)+\sin(\alpha-\theta)]$$

which, of course, is from the first aforementioned trigonometric relation, equal to $-r\cos\theta$. If $r\cos\theta$ is desired, it is obvious that it can be produced by running $-r\cos\theta$ through an operational amplifier to change its sign.

To generate $r\sin\theta$ by making use of the second of the aforementioned trigonometric relationships, it being remembered that $r=\sin\alpha$, use is made of certain quantities generated in the aforedescribed circuit for supplying the second component generator. The quantity $-(\alpha+\theta)$ obtained from terminal 256 is applied at terminals 258 and 260 of a cosine generator.

This cosine generator is identical with that of FIG. 10 with switch 97 thrown to the $\pi/2$ position. The output of this cosine generator appears as $-\cos(\alpha+\theta)$ at terminal 262. The quantity $\cos(\alpha-\theta)$ is obtained by the use of a second cosine generator identical with that of FIG. 10 plus an operational amplifier used for sign reversal. This second cosine generator receives at its terminals 264 and 266 the quantity $-(\alpha-\theta)$ obtained at junction 268 of amplifier 222. There then appears at junction 270 the quantity $-\cos(\alpha-\theta)$ which has its sign reversed by an operational amplifier and emanates at terminal 272 of amplifier 208 as the quantity $\cos(\alpha-\theta)$.

The quantity $-\cos(\alpha+\theta)$ from 262 is fed through resistor 274 to summing junction 276 and similarly $\cos(\alpha-\theta)$ is fed through an identical resistor 278 from terminal 272. Since feedback resistor 280 of amplifier 210 has half the value of resistor 274 or 278, the output at terminal 282 is $-\tfrac{1}{2}[\cos(\alpha-\theta)-\cos(\alpha+\theta)]$ which equals $-r\sin\theta$. If $r\sin\theta$ is desired it can readily be obtained by passing the output at terminal 282 through a sign-reversing amplifier.

Figure 15:
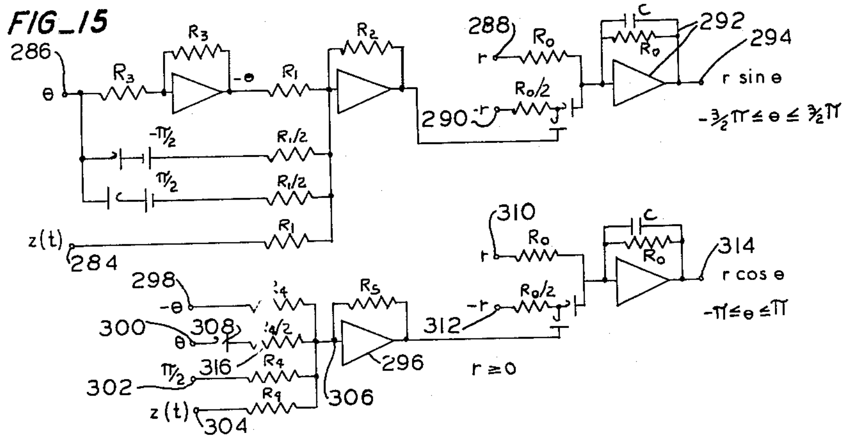
FIG. 15 is a schematic diagram of an apparatus for accomplishing polar to rectangular transformations by direct application of the basic method of the invention.

Adaptation of Method B to resolving is less involved than the adaptation of Method A. All that is required, in effect, is replacement of the unity inputs of the circuits of FIGS. 7 or 12 by $r$ and $-r$, where $r\geqq 0$. One preferred embodiment of a resolver employing Method B is shown in FIG. 15. The arc sine time function $z(t)$ is applied at terminal 284 and compared in effect with the value of $\theta$ applied at terminal 286. On the basis of the comparison the circuit selects either $r$ or $-r$, from the circuit including terminals 288 and 290, feeds this into averaging amplifier-filter circuit 292 to produce the output $r\sin\theta$ at terminal 294.

The range of $\theta$ over which this circuit is applicable is between $-3\pi/2$ and $3\pi/2$, as fully explained in the description of the related circuit in FIG. 12.

The $r\cos\theta$ component is generated by feeding into the comparator amplifier 296, $-\theta$ at terminal 298, $+\theta$ at terminal 300, $\pi/2$ at terminal 302, and $z(t)$ at terminal 304. When $\theta$ is positive, it being remembered that all voltages are measured with respect to the substantially zero potential of the summing junction 306, there is no conduction through diode 308 and therefore the comparator compares $z(t)$ with $(\pi/2-\theta)$. On the basis of the comparison, the circuit selects either $+r$ or $-r$ from the circuit including terminals 310 and 312 and produces the averaged output of the auxiliary variable at terminal 314 equal to $r\cos\theta$. Since the inherent limits of the effective input under which this circuit can operate correctly are from $-\pi/2$ to $+\pi/2$, it is apparent that the device is correctly operable for values of $\theta$ as high as $\pi$ inasmuch as $(\pi/2-\pi)=-\pi/2$, constituting one of the limits. On the other hand, when $\theta$ is negative, the diode 308 conducts and the effective input then is the sum of $-\theta$ from terminal 298; $2\theta$ from terminal 300 (because of the half-sized resistor 316); and $\pi/2$ from terminal 302. This sum, which amounts to $(\theta+\pi/2)$, may be permitted to reach the value $\pi/2$ but not exceed it. To reach this limit value, $\theta$ may go as far negative as $-\pi$, thus defining the other limit of operation of the device as $\theta\geqq-\pi$. It is of interest to note that when $\theta$ is positive, the input at terminal 306 is positive, and when $\theta$ is negative, the input at terminal 306 is still nevertheless positive.

Figure 16:
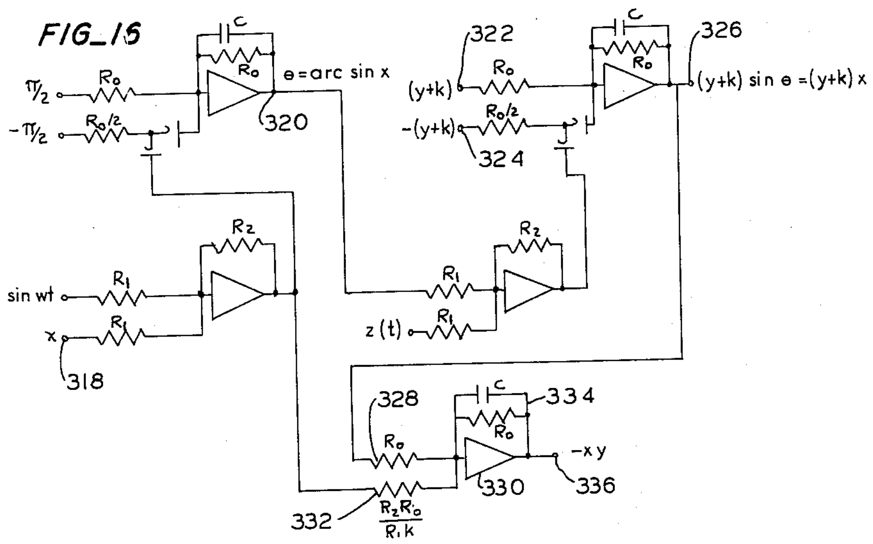
FIG. 16 is a schematic diagram of a four-quadrant multiplier.

A four quadrant multiplier using Method B is shown in FIG. 16 for producing substantially the quantity $xy$. The quantity $x$ is fed into terminal 318 and appears at terminal 320 as $\theta=\arcsin x$. $\theta$ is compared with $z(t)$ and, on the basis of the comparison, there is selected either $(y+k)$ or $-(y+k)$ from the circuit including terminals 322 and 324 so that the averaged quantity appearing at terminal 326 is $(y+k)\sin\theta=(y+k)x$. The output of terminal 326 is fed through resistor 328 into amplifier 330 which is also supplied with the quantity $$-\frac{R_2}{R_1}(\sin\omega t+x)$$

applied through another input resistor 332. The RC filter 334 is arranged to filter out the term appearing at frequency $\omega$ thus allowing at the output terminal 336 simply the quantity $-xy$. If the positive value of the product is required, it suffices to pass it through a sign-reversing amplifier.

(6) Rectangular to polar transformations: Of the possible ways of carrying out such transformations, perhaps the most convenient is to seek the solution of the implicit equations $y-r\sin\theta=0$, $x-r\cos\theta=0$ for specified values of $x$ and $y$, using the circuits of FIGS. 14 or 15 to form the products $r\sin\theta$ and $r\cos\theta$.

(7) Generation of some other trigonometric functions: Among the more important of these are the tangent and cotangent functions which are readily generated by the implicit solution of the equations $u\cos\theta-\sin\theta=0$ and $v\sin\theta-\cos\theta=0$, respectively, for a given value of $\theta$. The circuit of FIG. 15 is easily adapted to carry out the solutions.

(8) Generation of $\ln x$: Consider the function $$V=V(0)e^{kt},\quad k>0,\quad 0\leqq t\leqq T$$

Define $$E(V, V_0)=\begin{cases}A_1 \text{ if } V\leqq V_0\\ A_2 \text{ if } V>V_0\end{cases}$$

where $V(0)\leqq V_0\leqq V(0)e^{kt}$.

Then, $$E_{ave}=\frac{1}{T}\left[\int_0^{t_0}A_1dt+\int_{t0}^{T}A_2dt\right]$$

where $$t_0=\frac{1}{k}\ln[V_0/V(0)]$$

Letting $A_2=0$, there results $$E_{ave}=\frac{t_0}{T}A_1=\frac{\ln[V_0/V(0)]}{\ln[V(T)/V(0)]}A_1$$

Further, letting $A_1=\ln[V(T)/V(0)]$, then $$E_{ave}=\ln[V_0/V(0)]$$

The generation of $y=y(0)e^{kt}$, $0\leqq t\leqq T$, on a periodic time basis can be accomplished in several ways. One preferred circuit for generating this time function is shown in FIG. 17.

Figure 17:
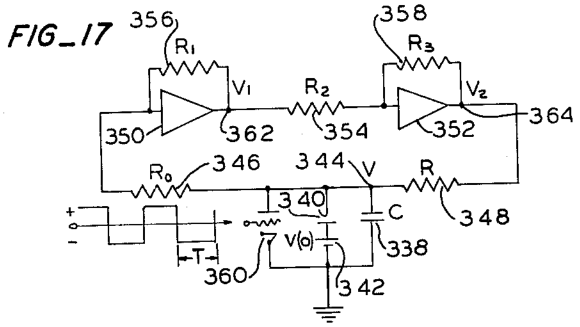
FIG. 17 is a schematic diagram of an apparatus for generating a periodic time representation of a positive exponential.

The circuit of FIG. 17 is constructed and operates as follows. A condenser 338 is connected across the series combination of diode 340 and battery 342. Terminal 344 of the condenser 338 serves as the junction between resistor 346 and resistor 348 which are connected in series with operational amplifiers 350 and 352 between which is interposed resistor 354. Amplifier 350 has a feedback resistor 356 and amplifier 352 has a feedback resistor 358. A triode 360 is connected in parallel with the condenser 338 and its grid is energized with a step wave as indicated on the adjacent graph.

Assuming initially that a negative pulse is applied to the grid of triode 360 so that the triode is cut off and does not conduct, then the condenser 338 lying across the diode-battery combination will tend to charge up to the voltage V(0). This will occur because initially the negative potential of the negative plate of battery 342 will cause the lower plate of condenser 338 to go negative, producing an induced positive charge at the upper plate of condenser 338, causing the cathode of diode 340 to become negative relative to the upper plate of condenser 338, making it thus negative also relative to the plate of diode 340 which is connected to the positive terminal of battery 342. This causes diode 340 to conduct, allowing a flow of charge from the battery 342 tending to build up the potential V at 344 toward the limit V(0), the potential of battery 342. However, as soon as the potential at 344 becomes ever so slightly above zero, it is fed through resistor 346 into amplifier 350, emanates at junction 362 as an amplified quantity with negative sign, designated as $V_1$. This in turn feeds through input resistor 354 into amplifier 352 and emanates at junction 364, still further amplified, and with its sign reversed so that it is now again positive with the designation $V_2$. The amplified potential $V_2$ is transmitted through resistor 348 to junction 344 where the process of amplification, just described, is repeated indefinitely, thus causing the potential at junction 344 to rise rapidly and continuously. As soon as the potential at 344 reaches V(0), the diode 340 no longer conducts and the potential at 344, representing the upper plate of the condenser 338, is free to rise indefinitely. However, as soon as a positive pulse is applied to the grid of diode 360, the triode conducts and thus applies practically a short circuit to the condenser 338, causing its voltage V to drop rapidly downward to the value V(0) until the next negative pulse applied to the grid of 360 allows the process to repeat but now starting from the value V(0).

An idealized analysis of this circuit yields the following voltage relations for the time during which the triode is cut off.

$$V_1=-\frac{R_1}{R_0}V$$

$$V_2=-\frac{R_3}{R_2}V_1$$

$$RC\frac{dV}{dt}+\frac{R}{R_0}V=V_2-V$$

Hence, $$RC\frac{dV}{dt}+\left(\frac{R}{R_0}+1-\frac{R_3R_1}{R_2R_0}\right)V=0$$

Making $R_3=R_2$ and letting $\tau$ denote RC, there results $$\frac{dV}{dt}+\left(\frac{R-R_1+R_0}{R_0\tau}\right)V=0$$

so that $V=V(0)e^{kt}$ where $$k=\left(\frac{R_1-R-R_0}{R_0\tau}\right)$$

$V(t)$ may now be compared with $V_0=V(0)x$ in the manner of the basic method of the invention to produce ln$x$.

Figure 18:
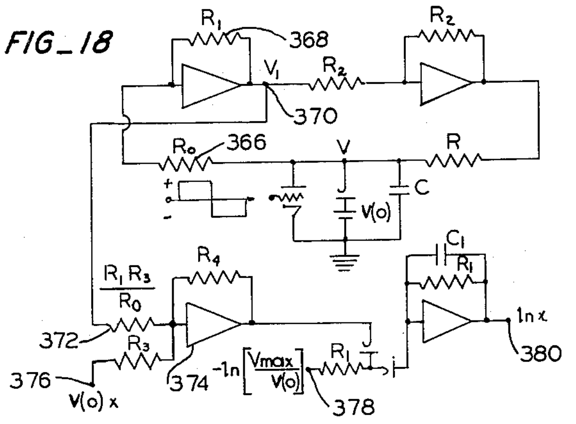
FIG. 18 is a schematic diagram of an apparatus using the apparatus of FIG. 17 in the basic method of the invention for generating a logarithmic function.

The additional circuitry for accomplishing this is shown in FIG. 18 wherein the counterpart of FIG. 17 has been somewhat altered only by making the value of resistor 358 equal to that of resistor 354. By virtue of the presence of resistors $R_1$ and $R_0$, the voltage $$V_1=-\frac{R_1}{R_0}V$$

will appear at terminal 370. Thence it is fed through input resistor 372 into the comparator circuit including amplifier 374. The unknown $x$ is first multiplied by the constant V(0) so that the quantity $V(0)x$ is fed into terminal 376. The comparator essentially compares V with $V(0)x$, since, effectively it receives —V from terminal 370 through resistor 372. On the basis of the comparison, the comparator selects either zero or the quantity $$-\ln\left[\frac{V_{max}}{V(0)}\right]$$

applied at terminal 378. $V_{max}$ is, of course, V(T). The average of the auxiliary variable appears at terminal 380 as ln$x$.

In the circuit of FIG. 17, and hence that part of FIG. 18 which constitutes a duplicate thereof, the period T during which the triode is cut off corresponding to the time that V increases from V(0) to V(T), is controlled by an independent square wave. The period of this square wave can be calculated to yield the proper terminal value for the rising exponential, but there is no automatically controlled relation between the constant $A_1$ and the period T shown in the circuit which might be desired for precision work. Such a relation can readily be established by comparing $A_1$ with V and letting the result of the comparison fix the period T, leading in this manner to a self-excited circuit. Similar considerations apply to the other circuitry presented here when improved performance is required.

Figure 19:
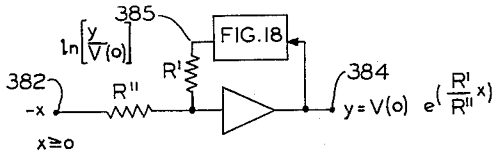
FIG. 19 is a schematic diagram of an apparatus using the apparatus of FIG. 18 in the feedback of an amplifier for generating an exponential function.

(9). Generation of $y=e^{kx}$, $k>0$, $x\geqq 0$: Since the inverse function is $$\frac{1}{k}\ln y$$

the circuit of FIG. 18 can be used in the feedback of an amplifier as shown in FIG. 19. Here $$\ln[y/v(0)]=\frac{R'}{R''}x$$

so that $$y=V(0)e^{\frac{R'}{R''}x}=V(0)e^{kx}$$

as required except for the constant V(0), which, of course, as previously explained, can always readily be removed if desired.

The circuit of FIG. 19 receives $-x$ as its input at terminal 382, where $x\leqq 0$. The output is obtained at terminal 384 and is designated as $y$. The box labeled "FIG. 18" has the property that if $V(0)q$ is fed into it, then its output is $$\ln q=\ln\frac{V(0)q}{V(0)}$$

Thus, when $y$ is fed in from terminal 384, the output at terminal 385 is $$\ln\left[\frac{y}{V(0)}\right]$$

Because of the feedback arrangement and the proportioning of the resistors, the output $y$ emanates, as previously indicated, in the form $V(0)e^{kx}$.

Figure 20:
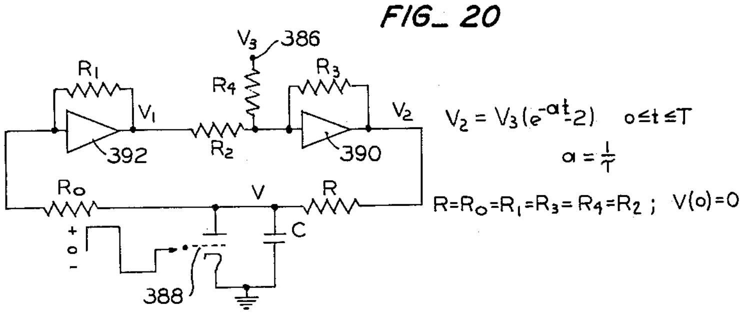
FIG. 20 is a schematic diagram of an apparatus for generating essentially a periodic time representation of a negative exponential.

(10) Generation of $y=e^{-kx}$, $k>0$, $x\geqq 0$: Idealized analysis of the circuit of FIG. 20 gives the following voltage relations:

$$V_1=-\frac{R_1}{R_0}V$$

$$V_2=-\frac{R_3}{R_2}V_1-\frac{R_3}{R_4}V_3$$

$$RC\frac{dV}{dt}+\frac{R}{R_0}V=V_2-V$$

Solving for $V_2$ results in the equation $$\frac{dV_2}{dt}+\frac{1}{R_0\tau}\left(R+R_0-\frac{R_1-R_3}{R_2}\right)V_2=-\frac{R_3(R+R_0)}{\tau R_0R_4}V_3$$

with $V_3$ a constant voltage and $\tau=RC$. Solution of this equation yields for $V_2$ $$V_2=V_3\left(\frac{K_2}{K_1}-\frac{R_3}{R_4}\right)e^{-K_1t}-\frac{K_2}{K_1}V_3$$

with $$V_2(0)=-\frac{R_3}{R_4}V_3$$

and $$K_2=\frac{R_3(R+R_0)}{\tau R_0R_4},\ K_1=\frac{1}{R_0\tau}\left(R+R_0-\frac{R_1R_3}{R_2}\right)$$

Now making $R=R_0=R_1=R_2=R_3=R_4$, then $$V_2=V_3e^{-\frac{1}{\tau}t}-2V_3$$

Let $1/\tau=a$. Then $V_2=V_3e^{-at}-2V_3$. From the requirement that $V\geq 0$ is imposed the condition that $V_2\geq 0$ so that $V_3$ must be a negative voltage. If now the voltage $2V_3$ be added to $V_2$, then $$-V_4=V_2+2V_3=V_3e^{-at}-2V_3+2V_3=-V_4(0)e^{-at}$$

where $-V_3=V_4(0)$. This is a pure falling exponential. The basic method of the invention can now be applied to $V_4$ to produce negative logs. Thus, define E as $$E=\begin{cases}B_1 \text{ if } |V_4|\leq y\\ B_2 \text{ if } |V_4|>y\end{cases}|V_4(T)|\leq y\leq |V_4(0)|$$

$$E_{ave}=\frac{1}{T}\left[\int_0^{t_0}B_2dt+\int_{t_0}^{T}B_1dt\right]$$

where $$t_0=\frac{1}{a}\ln\left[\frac{V_4(0)}{y}\right]$$

$$E_{ave}=\frac{1}{T}[B_2t_0+B_1(T-t_0)]$$

Choose $B_1=0$. Then, $$E_{ave}=\frac{\ln\left[\frac{V_4(0)}{y}\right]}{\ln\left[\frac{V_4(0)}{V_4(T)}\right]}B_2$$

If now $$B_2=\ln\left[\frac{V_4(0)}{V_4(T)}\right]$$

there results $$E_{ave}=\ln\left[\frac{V_4(0)}{y}\right]$$

Figure 21:
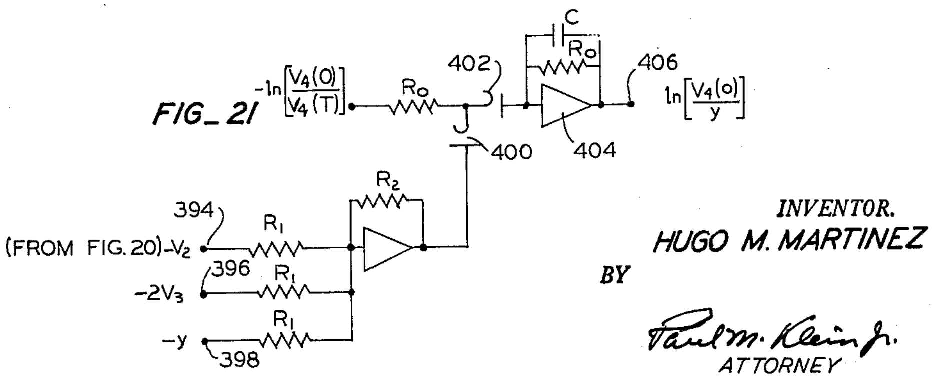
FIG. 21 is a schematic diagram of an apparatus using the apparatus of FIG. 20 and the basic method of the invention to generate the logarithm of reciprocals.
Figure 22:
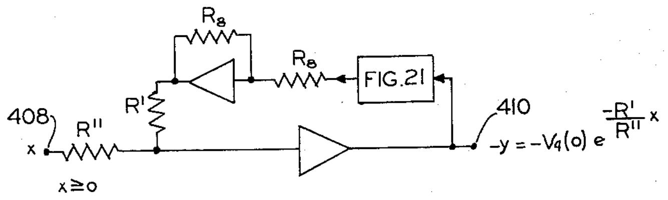
FIG. 22 is a schematic diagram of a circuit using the apparatus of FIG. 21 in the feedback of an amplifier for producing negative exponentials.

The circuit of FIG. 21 shows the generation of this $E_{ave}$, while FIG. 22 makes use of the circuit of FIG. 21 to produce $e^{-kx}$ as required.

The circuit of FIG. 20 used to generate a periodic time representation of an expression including a falling exponential operates as follows. Into terminal 386 is fed a constant voltage $V_3$, previously shown to be negative. At the start, the voltage V is assumed to be zero, and a negative pulse is assumed to be applied to the grid of triode 388. The negative voltage $V_3$ passes through the amplifier 390 and appears as a positive voltage at $V_2$, which produces a current through resistor R that causes the condenser C to charge up, causing the voltage V to increase positively. As the positive voltage at V passes through amplifier 392, it appears as a negative voltage $V_1$ and combines with the voltage $V_3$ to increase the absolute magnitude of the input to amplifier 390. This causes a further increase in the positive voltage V. This process continues, producing the positive, increasing voltage $V_2=V_3(e^{-at}-2)$. When a positive pulse is placed on the grid of tube 388, the tube conducts and effectively short circuits and discharges the condenser C, reducing the voltage V to zero and thereafter the process repeats, thus yielding at $V_2$ a periodic time representation of the function.

In FIG. 21 the voltage $-V_2$ from FIG. 20 is applied at terminal 394 and there is added to it at terminal 396 a voltage $-2V_3$ and at terminal 398 a voltage representing $-y$. On the basis of the comparison of $-y$ with $-[V_2+2V_3]$, there is selected by means of the electronic switches 400 and 402 either zero or $$-\ln\left[\frac{V_4(0)}{V_4(T)}\right]$$

These two voltages constitute the two values of the auxiliary variable E which are then averaged and subjected to sign reversal by amplifier 404 with its associated filter circuit, thus yielding at terminal 406

$$\ln\left[\frac{V_4(0)}{y}\right]$$

The circuit of FIG. 21 is embodied in a feedback loop in FIG. 22 wherein an input of the unknown $x$ at terminal 408 yields at terminal 410 the voltage $$-y=-V_4(0)e^{-\frac{R'}{R''}x}$$

This is of the required form for a negative exponential, namely, $y=e^{-kx}$ which can readily be obtained from terminal 410 by getting rid of the coefficient $V_4(0)$ and changing the sign in a fashion well known in the art.

Figure 23:
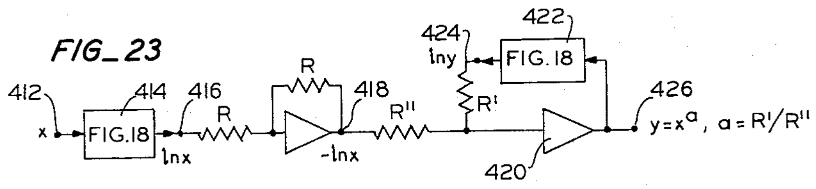
FIG. 23 is a schematic diagram of a circuit using the apparatus of FIG. 18 for producing positive constant powers of a variable.

(11) Generation of rational and irrational constant powers: With the means for generating $\ln x$, $$V(0)<x<V(T)$$

as with the circuit of FIG. 18, it becomes relatively easy to generate powers of $x$. As shown in the scheme of FIG. 23, $x$ is fed into terminal 412 of element 414 which constitutes the circuit of FIG. 18. This produces at terminal 416 $\ln x$ which appears with its sign reversed at 418, and, there, constitutes the input to amplifier 420. Element 422, constituted by another reproduction of FIG. 18, is placed in the feedback loop of amplifier 420 and produces at 424 the ln of what is fed into it, namely $\ln y$, which is the voltage at output terminal 426. From the following equations setting forth the operation of the conventional operational amplifier 420, it is clear that $y=x^a$. Recalling that the potential at the summing junction of an operational amplifier is substantially zero, then the current at the summing junction to amplifier 420 is given by the following:

$$\frac{-\ln x}{R''}+\frac{\ln y}{R'}=0$$

or $$\ln y=\frac{R'}{R''}\ln x$$

from which $$y=x^{\frac{R'}{R''}}\text{ or }x^a$$

where $$a=\frac{R'}{R''}$$

It should be noted that duplicate use of the circuit of FIG. 18 in the circuit of FIG. 23 does not require its complete duplication because FIG. 17 is common to both. Thus, instead of eight amplifiers, only six are required. This points up one of the advantages of the basic method of this invention, namely, that once a periodic time representation of an inverse function is obtained, it can be used for comparing against the amplitudes of many variables to produce as many independent direct functions.

Figure 24:
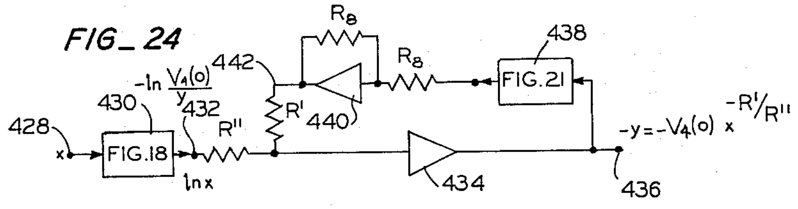
FIG. 24 is a schematic diagram of a circuit using the apparatus of FIG. 18 and of FIG. 21 for generating negative constant powers of a variable.

While the circuit of FIG. 23 will yield positive powers, it is altogether possible to obtain negative powers by a similar process. A circuit for doing this is shown in FIG. 24. The unknown $x$ is fed into terminal 428 of element 430, constituted by a reproduction of FIG. 18 to yield $\ln x$ at terminal 432. $\ln x$ serves then as the input to amplifier 434, whose output labeled as $-y$ at terminal 436 is fed back through a branch including element 438, constituted by a reproduction of FIG. 21 and a sign reversing amplifier 440 yielding at terminal 442 the quantity $$-\ln \frac{V_4(0)}{y}$$

Mathematical analysis similar to that immediately preceding for FIG. 23 shows that in FIG. 24 the output at terminal 436 is $$-y=-V_4(0)x^{-\frac{R'}{R''}}$$

If it is desired to change the sign and eliminate the constant coefficient, this can easily be done in the usual manner.

(12) Generation of variable powers: The general case corresponds to raising a variable to a variable power, i.e., $x^y$. To accomplish this, there must first be determined the nature of the variable which is to constitute the exponent. Without loss of generality, let it be assumed that it is always positive, as is the variable constituting the base. Referring back to the derivation of the mathematical expression for the generation of $\ln x$, let $A_1$ be the variable $y$ instead of the constant $$\ln \frac{V(T)}{V(0)}$$

with the stipulation that its rate of variation is small compared to $1/T$. Then, $$E_{\text{ave}}=by\ln\left[\frac{V_0}{V(0)}\right]$$

where $$b=\frac{1}{\ln\left[\frac{V(T)}{V(0)}\right]}$$

Figure 25:
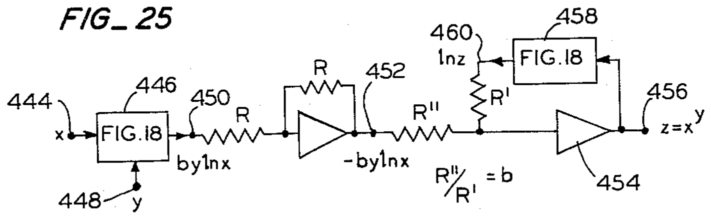
FIG. 25 is a schematic diagram of a circuit using the apparatus of FIG. 18 for generating variable powers of a variable.

The output of the circuit of FIG. 18 will then be $by\ln x$. Use of FIG. 18 as shown in the feedback loop in FIG. 25 will yield $x^y$.

The quantity $x$ is fed into terminal 444 of the element 446 constituting a reproduction of FIG. 18 and the quantity $y$ is fed in at terminal 448 to be selected as one of the two discrete values of the auxiliary variable E. The output at terminal 450 is then $by\ln x$ which appears with its sign reversed at terminal 452, where it feeds into operational amplifier 454, yielding an output designated as $z$ at terminal 456. The feedback element 458, constituted by a reproduction of FIG. 18, yields at terminal 460 $\ln z$. By making the ratio $$\frac{R''}{R'}=b$$

the output $z$ becomes equal to $x^y$.

(13) Generation of $x^n$ and $x^{1/n}$, $n$ an integer, without use of logs: Under application 11 it was shown how rational and irrational powers could be generated through the use of the log circuits. However, $x^n$ and $x^{1/n}$, where $n$ is an integer, can also be generated by a different application of the basic method of the invention. It is known that the quadratic is the integral of a linear function, the cubic an integral of the quadratic, etc. In the light of this knowledge, the following procedure is available for using the basic method of the invention to generate integral roots:

(*a*) Produce a periodic time representation of a linear function (sawtooth, triangle, etc.).

(*b*) Time integrate the linear function of (*a*) to produce a periodic time representation of a quadratic.

(*c*) Apply the basic method of the invention to the time function of (*b*) to obtain the square root function.

(*d*) Time integrate the time function of (*b*) to produce a periodic time representation of a cubic.

(*e*) Apply the basic method of the invention to the time function of (*d*) to obtain the cube root function.

(*f*) And so on for higher roots.

With the means of producing the integral root functions as above, these can now be used as feedback circuits in operational amplifiers to produce the integral powers.

A variety of ways exists for producing periodic linear time functions as required in (*a*). The circuit of FIG. 13, less the $d\theta/dt$ input amplifier and diodes, is the familiar multivibrator circuit often used in analog computing. For simplicity and for illustrative purposes, it will be used in the following for generating the periodic linear time function. For step (*b*) reference is again made to the circuit of FIG. 20 and its analysis. The equation for $V_1$ is $$\frac{dV_1}{dt}+\frac{R_1}{\tau R_0}\left(\frac{R+R_0}{R_1}-\frac{R_3}{R_2}\right)V_1=\frac{R_1R_3}{\tau R_0R_4}V_3$$

$\tau=RC$.

Letting $R_1=R_2=R_3=R_4$ for simplicity, then $$\frac{dV_1}{dt}+\frac{1}{\tau R_0}(R+R_0-R_1)V_1=\frac{R_1}{\tau R_0}V_3$$

Figure 26:
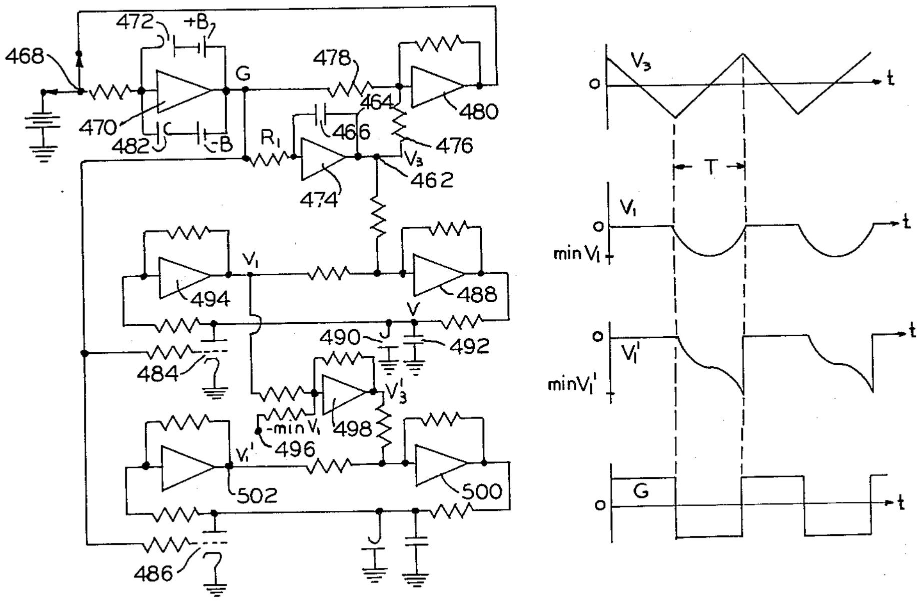
FIG. 26 is a schematic diagram of an apparatus for producing periodic time representations of a linear function, a quadratic function, a cubic function, etc.
Figure 27:
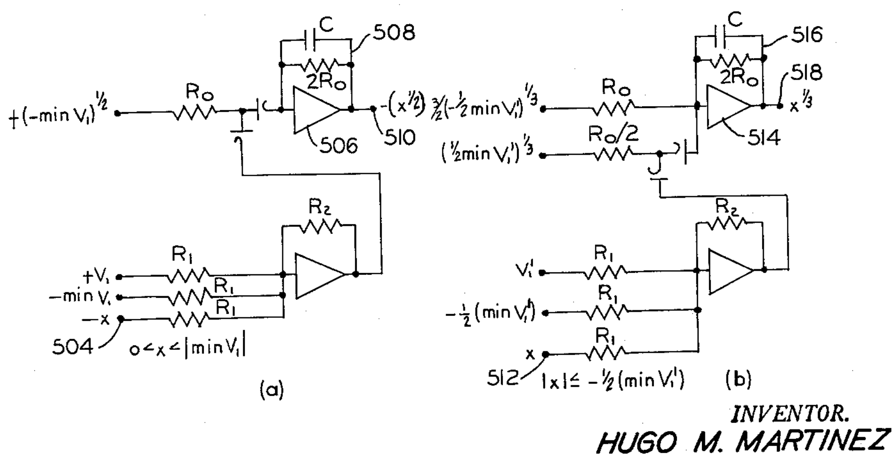
FIG. 27(*a*) is a schematic diagram of a circuit using the apparatus of FIG. 26 for generating square roots.

Further, by letting $R+R_0=R_1$, then $$\frac{dV_1}{dt}=\frac{R_1}{\tau R_0}V_3$$

the equation of a perfect integrator. Moreover, it is an integrator which can be reset to zero very quickly to obtain speed and at the same time minimize the effect of drift. FIG. 26 shows two of these circuits used in tandem with the linear time function circuit to produce periodic time representations of the square and cubic functions. FIG. 27 illustrates sampling circuits to obtain the square root and cube root functions, and FIG. 28 uses these to obtain the square and cube functions.

The operation of FIG. 26 starts out with the previously mentioned linear time function generated at 462 as a triangular voltage wave $V_3$. The generation of this voltage wave is initiated, as in FIG. 13, by applying a battery or the like to make terminal 464 of condenser 466 positive while the input at 468 to amplifier 470 is made negative. With terminal 468 negative, diode 472 conducts, applying battery +B at junction G. This positive input from G to amplifier 474 causes the condenser 466 to discharge and go negative so that the voltage $V_3$ descends linearly from its initial positive value to a corresponding negative value. If resistors 476 and 478 are equal, then when the absolute magnitude of $V_3$ exceeds by ever so little the voltage at G supplied by battery +B, the net input to amplifier 480 will go negative. This means its output, and hence terminal 468, will go positive and diode 472 will cease to conduct while diode 482 will begin to conduct. With the voltage of −B supplied at G, terminal 464 will now receive a positive input from amplifier 474 and $V_3$ will rise from its negative minimum, toward a positive maximum, at which time the process will start repeating as from the initial conditions. During the descent of $V_3$ from its initial positive value down to its negative minimum value, and during each successive interval in which this descent is repeated, the positive potential at G will cause the grids of triodes 484 and 486 to go positive, permitting these triodes to conduct for reasons later explained. The graph of the variation of the voltage of $V_3$ with time appears adjacent the upper section of FIG. 26.

With $V_3$ applied at 462 as the input to amplifier 488, $V_1$ becomes a constant multiplied by the integral of $V_3$. At the start, when $V_3$ is positive, V is negative, by virtue of the sign reversal occasioned by amplifier 488, and diode 490 shorts out condenser 492 so that the potential at V is zero, and therefore $V_1$ is also zero. Diode 490 continues to short out the condenser 492 so long as $V_3$ remains positive. After $V_3$ descends to zero and starts to go negative, V would become positive and diode 490 would no longer short out condenser 490. However, as has been previously mentioned, triode 484 is biased to conduction during the entire descent interval of $V_3$. Thus, when $V_3$ goes negative, V becomes positive and therefore, although no longer shorted out by diode 490, V will be shorted by triode 484 until $V_3$ reaches its minimum negative value. Thus, $V_1$ will remain at zero during the entire descent interval of $V_3$. As $V_3$ starts to ascend, G goes negative and hence triode 484 is no longer capable of conducting and short-circuiting condenser 492. Therefore, as $V_3$ ascends from its negative minimum toward zero, V remains positive during this interval and builds up a positive charge on condenser 492 and consequently, $V_1$, because of the sign reversal of amplifier 494, starts to go negative from its initial zero condition. When $V_3$ reaches zero, in its ascent, and starts to go positive, then the output of amplifier 488 goes negative and condenser 492 begins to discharge so that $V_1$ thereupon begins to rise from its negative minimum toward zero. As $V_3$ continues positive during the time interval immediately succeeding the instant at which it reached its maximum, condenser 492, having been fully discharged, will start to go negative and thereupon diode 490 will short circuit it to ground. Thus, the cycle begins again. The graph of the quadratic $V_1$, which is a parabola, appears to the right of the circuit including $V_1$.

To generate the desired cubic, $V_1$ has added to it the quantity $-\min V_1$ applied at terminal 496, which raises the parabolic graph until it is just tangent to the abscissa axis (the $t$ axis). Then, the sum has its sign reversed by passing through amplifier 498 and is fed into amplifier 500 as $V_3'$. The graph of $V_3'$ is a parabola, which is the mirror image relative to the abscissa axis of the graph of $V_1 - \min V_1$. That is, the graph of $V_3'$ is a parabola concave downward and with its apex tangent to the axis of abscissas.. The reason for choosing this $V_3'$ function to integrate instead of integratnig $V_1$ directly is to insure the production of a conventional pure cubic and to simplify this production by using the same type of circuit as that used for the production of $V_1$ and using the same triode grid pulse for initiating repetition of the periodic time representation. At terminal 502, $V_1'$ is produced which, as shown in the adjacent graph, is a conventional cubical parabola displaced, however, so that its point of inflection lies at the distance $\frac{1}{2}\min V_1'$ below the abscissa axis.

In FIG. 27($a$) is shown a circuit using the basic method of the invention to generate $-(x^{1/2})$. The value of $-x$ applied at terminal 504 is compared with the value of the quantity $[+V_1 - \min V_1]$, which quantity is represented by the graph produced by raising the graph of $V_1$ in FIG. 26 until the vertex of its parabolic portion lies tangent to the abscissa axis. On the basis of the comparison, there is generated by amplifier 506 two values of an auxiliary variable which values are averaged by the filter network 508 and appear at the output terminal 510 as $-(x^{1/2})$. If desired, the sign of the output can be reversed in the usual manner by passing the output through an operational amplifier.

If the quantity $[V_1 - \min V_1]$ represented a 100% duty cycle of the quadratic, which would appear on a graph as a series of identical contiguous parabolic segments, then the desired $-(x)^{1/2}$ could be produced by simply comparing $-x$ with $[V_1 - \min V_1]$ and generating, on the basis of the comparison, an auxiliary variable having the two values zero and $(\min V_1)^{1/2}$ and averaging these two values. However, the quantity $[V_1 - \min V_1]$ does not represent a 100% duty cycle of the quadratic. It represents a 50% duty cycle. The remaining 50% of each period is occupied by the quantity $[-\min V_1]$ which would show on a graph as a straight horizontal line connecting two parabolic segments.

During the "horizontal" or non-duty portion of the time representation, the summing junction of the comparator in FIG. 27($a$) sees a net positive input, since the $x$ input is prescribed as lying between zero and $|\min V_1|$. This means that during this 50% of the total period, the lower diode conducts and the input to averaging amplifier 506 is zero. For the remaining 50% of the cycle (the duty portion of the cycle), $x$ is being compared with the parabolic segment of $V_1$ and hence during this half of the cycle, the average input to 506 is quite properly $x^{1/2}$. Since for the non-duty half of each cycle the input to 506 is zero while for the duty half of each cycle the input to 506 is effectively $x^{1/2}$, it is necessary, in order to obtain the correct output over the full cycle, that the amplifier 506 should be arranged to yield at 510 a quantity whose absolute value is twice the absolute value of the average input during the full cycle. This is accomplished by making the feedback resistor of size $2R_0$. The same end result could equally well be accomplished by leaving the feedback resistor as $R_0$ and effectively doubling the input to 506. This doubling could be accomplished either by feeding $2(-\min V_1)^{1/2}$ into input resistor $R_0$ or by feeding in $(-\min V_2{}^{1/2}$, as shown in FIG. 27($a$), but changing the input resistor to $R_0/2$.

In the event that the non-duty portion of the cycle were, say, 75%, then a multiplying factor of 3 instead of 2 would be required. Similar allowance would have to be made for duty cycles of other percentages.

In FIG. 27($b$) is shown a circuit using the basic method of the invention to generate the cube root of $x$. The value of $x$ applied at terminal 512 is compared with the value of the quantity $[V_1' - \frac{1}{2}(\min V_1')]$, which quantity is produced by raising $V_1'$ until the point of inflection of its curvilinear segment lies on the abscissa axis. Its curvilinear segment thereupon becomes essentially the conventional cubic. On the basis of the comparison, there is generated by amplifier 514 an auxiliary variable having two values depending on whether the value of the periodic time representation is greater or less than $x$. These two values of the auxiliary variable are averaged by the filter network 516 and appear at the output terminal 518 as $x^{1/3}$.

As was the case with the quadratic, the periodic time representation of the cubic does not exhibit a 100% duty cycle, but rather, a 50% duty cycle. If the cubic time representation were a 100% duty cycle representation, then the apparatus of FIG. 27($a$) could be made to select as the values of the auxiliary variable $(\frac{1}{2}\min V_1')^{1/3}$ and $(-\frac{1}{2}\min V_1')^{1/3}$ and simply averaging these would yield the correct result $x^{1/3}$ as the output at 518. However, during 50% of the cycle, $x$ is being compared with the non-duty value of $V_1'$ which is represented as a horizontal line on a graph connecting two cubic segments and having an ordinate value $-\frac{1}{2}(\min V_1')$. During this half of the cycle, the summing junction of the comparator in FIG. 27($b$) sees a net input which is either positive, or zero (this latter in the isolated case when $|x| = -\frac{1}{2}(\min V_1')$). For either a net positive or a zero input to the summing junction of the comparator, the apparatus of FIG. 27($b$) would, if it were supplied only with the values of the auxiliary variable $(\frac{1}{2}\min V_1')^{1/3}$ and $(-\frac{1}{2}\min V_1')^{1/3}$ necessarily select as its output at 518 during this 50% of the cycle the value $-(\frac{1}{2} \min V_1')^{\frac{1}{3}}$ which would make the average output over the entire cycle incorrect. The average value during the remaining 50% of the period wherein $x$ is being compared with the cubic would be correctly $x^{\frac{1}{3}}$. Therefore, the average over the total period T would be $$\frac{\frac{T}{2}x^{1/3}+\frac{T}{2}\left(-\frac{1}{2}\min.\ V_1'\right)^{1/3}}{T}=\frac{x^{1/3}}{2}+\frac{1}{2}(-\frac{1}{2}\min.\ V_1')^{1/3}$$

which, it is apparent, differs appreciably from the proper value $x^{\frac{1}{3}}$. It differs from this proper value in that the proper value $x^{\frac{1}{3}}$ has been divided by two and thereafter had added to its half-value a constant. To correct this incorrect value, it is necessary to first subtract from the incorrect value the constant $\frac{1}{2}(-\frac{1}{2} \min V_1')^{\frac{1}{3}}$ which had been added to it, and thereafter to multiply by the factor 2. This correction has been accomplished in the circuit of FIG. 27(*b*) by causing the input through resistor $R_0$ to be $\frac{3}{2}(-\frac{1}{2} \min V_1')^{\frac{1}{3}}$ instead of $(-\frac{1}{2} \min V_1')^{\frac{1}{3}}$ and by causing the feedback resistor to have a value $2R_0$ instead of $R_0$.

From the foregoing analysis of FIGS. 27(*a*) and 27(*b*), which applies in general to all applications of this invention where a periodic time representation of less than 100% is used, it is clear that the basic method of the invention is nevertheless practiced in all such applications during the duty portion of the periodic time representation. But, in general, the apparatus usually used is such that the average value of the auxiliary variable, $E_{ave}$, produced from the practice of the basic method of the invention is, in essence, altered by the equipment acting in the presence of the extraneous or non-duty portion of the cycle of the periodic time representation. The alteration in general essentially changes $E_{ave}$ to $K_1E_{ave}+K_2$. Thus, to retrieve $E_{ave}$ from this new quantity, it is required to subtract $K_2$ and then divide by $K_1$. This is precisely what has been accomplished in the circuits of FIG. 27 wherein, it is again emphasized, the basic method of the invention is nevertheless being practiced.

It is possible to prescribe in rather general terms the procedure exemplified in FIG. 27(*b*) for carrying out the method of the invention which is applicable both to situations where the periodic time function has a 100% duty cycle and where it has less than a 100% duty cycle. Under this procedure it is required to generate two newly-defined values for an auxiliary variable to be averaged to produce the desired function. These newly-defined values of the auxiliary variable reduce, of course, to the original values $A_1$ and $A_2$ in the case when the duty cycle is 100%.

The aforementioned procedure is set forth in the following

GENERALIZED STATEMENT OF METHOD OF FUNCTION GENERATION EXTENDED TO INCLUDE DUTY CYCLES LESS THAN 100%

Object: To generate $y=f(x)$

*Step 1.*—Generate a periodic wave form $c(t)$ containing a periodic time representation of $f^{-1}(y)$, i.e., the inverse of $f(x)$, wherein $T=$ period of $c(t)$, i.e., $c(t)+T)=c(t)$, and wherein $c(t)$ is constant during each portion of the period T not representing $f^{-1}(y)$.

*Step 2.*—Compare the amplitude of this time function with a given value $x_0$ of the independent variable of the required function $f(x)$.

*Step 3.*—Generate as a result of Step 2, a discontinuous function $$E(c(t),x_0)=\begin{cases} A_0+\frac{A_1}{K} \text{ during an interval of time equal to that when } c(t)\leq x_0. \\ A_0+\frac{A_2}{K} \text{ during an interval of time equal to that when } c(t)>x_0. \end{cases}$$

where the values of $A_1$ and $A_2$ are time independent, or at least do not vary appreciably over a single period of $c(t)$, and where $T_D$=that portion of T devoted to representing $f^{-1}(y)$
$T_N$=that portion of T not devoted to representing $f^{-1}(y)$
$K=T_D/T$
$1-K=T_N/T$
$p$=the fraction of $T_N$ devoted to $A_1$
$1-p$=the fraction of $T_N$ devoted to $A_2$ $$A_0=-\frac{(1-K)}{K}[pA_1+(1-p)A_2]$$

*Step 4.*—Take the time average of $E(c(t),x_0)$. This time average, for appropriately chosen values of $A_1$ and $A_2$, is proportional to the value of the dependent variable $y$ corresponding to $x=x_0$.

An example of the application of the foregoing statement of the extended method of function generation to the specific embodiment of FIG. 27(*b*) can be seen from the following.

The apparatus of FIG. 27(*b*) is intended to produce the cube root of $x$ from an input of $x$. Applying the first step of the basic method of the invention requires in principle the generation of a periodic time representation of a cubic of the general form $y=kt^3$. Further steps in the application of the basic method of the invention would require comparison of $x_0$ with this periodic time representation and generating, upon the basis of the comparison, either $A_1$ or $A_2$, depending on whether the value of the cubic time function is less than or exceeds the value of $x_0$. Assuming for convenience that the chosen segment of $y=kt^3$ is symmetrical about its point of inflection, which is on the abscissa axis, then, under the teaching of the invention, $A_1$, in such a case, would normally be simply the inverse of the positive limiting value of the cubic time function, and $A_2$ would be the inverse of the negative limiting value of the function $y=kt^3$. Assuming that the positive limit of the function $y=kt^3$ were $(-\frac{1}{2} \min V_1')$ and that its negative limit were $(\frac{1}{2} \min V_1')$, then the application of the basic method of the invention would require the generation of $A_1=(-\frac{1}{2} \min V_1')^{\frac{1}{3}}$, a positive quantity, and
$A_2=(\frac{1}{2} \min V_1')^{\frac{1}{3}}$, a negative quantity.

To envision the application of the method of the invention extended to a situation where the duty cycle of the periodic time representation of the inverse function is less than 100% requires consideration of the generation of $c(t)$, which is defined, according to the statement of the method, to include $f^{-1}(y)$. In the case of the cubic under discussion, this would require that $c(t)$ include the function $kt^3$. The apparatus of FIG. 26, which is used in FIG. 27(*b*), generates a periodic wave form $V_1'$, which includes a curvilinear segment cubical in nature, but not precisely of the form $kt^3$. It differs from the form $kt^3$ in two respects: its point of inflection is not on the abscissa axis but below it, and it is the mirror image of $kt^3$ so that its equation is really of the form $y=-kt^3$. By adding to $V_1'$, as is done in FIG. 27(*b*), the quantity $-\frac{1}{2}(\min V_1')$, there is accomplished the raising of the entire wave form $V_1'$ to a level at which the point of inflection of its cubical segment lies on the abscissa axis. Since this raised wave form can now be said to include the segment of the general form $-kt^3$, then the negative of this raised wave form can be said to include the negative of $-kt^3$, namely $kt^3$, and and by this token, the negative of the raised wave form may properly then be designated as $c(t)$ and it is proper to write $c(t)=-[V_1'-\frac{1}{2}(\min V_1')]$ and from this it is proper to write $$V_1'-\frac{1}{2}(\min V_1')=-c(t)$$

Bearing in mind that $c(t)$ is the negative of the raised wave form of FIG. 26, preparation can now be made to calculate the values of the auxiliary variable required to be generated in accordance with Step 3 of the Generalized Statement of the Extended Method.

$p=1=$fraction of $T_N$ devoted to $A_1$
$1-p=0=$fraction of $T_N$ devoted to $A_2$
$K=T_D/T=\frac{1}{2}$
$1-K=\frac{1}{2}$ $$A_0=-\frac{1/2}{1/2}[1(A_1)+0(A_2)]=-A_1$$

Recalling the fact that the apparatus of FIG. 27(*b*) has available at its input $-c(t)$ rather than $c(t)$, it becomes convenient to rephrase the definition of $E(c(t),x_0)$ in Step 3 as follows, by simply transposing across the inequality signs:

Generate $$(Ec(t),x_0)=\begin{cases} A_0+\frac{A_1}{K}\text{during the interval of time when } x_0-c(t)\geq 0. \\ A_0+\frac{A_2}{K}\text{during the interval of time when } x_0-c(t)<0. \end{cases}$$

The two values of the auxiliary variable are then $$A_0+\frac{A_1}{K}=-A_1+\frac{A_1}{1/2}=A_1=(-1/2\min V_1')^{1/3}$$

$$A_0+\frac{A_2}{K}=-A_1+\frac{A_2}{1/2}=2A_2-A_1=3(1/2\min V_1')^{1/3}$$

It can be seen that these two required values of the auxiliary variable are in fact generated by the apparatus of FIG. 27(*b*). The input to the comparator in this figure represents $$x_0+[V_1'-\tfrac{1}{2}(\min V_1')]=x_0-c(t)$$

When this quantity is equal to or greater than zero, the input to the comparator is either plus or zero and its output applied to the plate of the lower diode is either negative or zero, which in each case prevents the lower diode from conducting. Therefore, the output of the averaging amplifier 514 at terminal 518 is in this instance $$-2[\tfrac{3}{2}(-\tfrac{1}{2}\min V_1')^{1/3}+2(\tfrac{1}{2}\min V_1')^{1/3}]$$
$$=(-\tfrac{1}{2}\min V_1')^{1/3}$$

which was one of the values shown from the preceding calculations to be necessary. When $x_0-c(t)<0$, the input to the comparator is negative, its output is positive, and therefore, the lower diode conducts so that the output at 518 under this circumstance is simply $$-2[\tfrac{3}{2}(-\tfrac{1}{2}\min V_1')^{1/3}]=3(\tfrac{1}{2}\min V_1')^{1/3}$$

which was the other value of the auxiliary variable previously calculated to be necessary.

Figure 28:
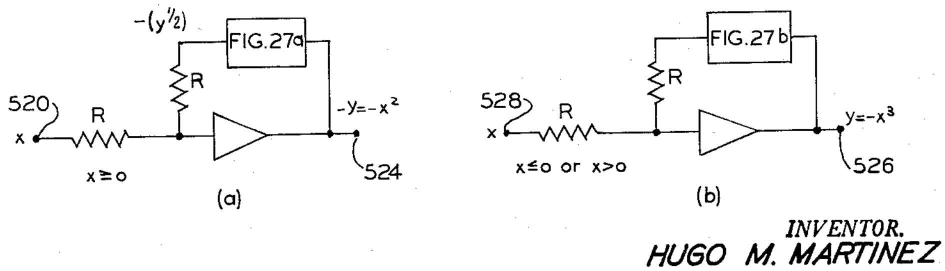
FIG. 28(*a*) is a schematic diagram of a circuit using the apparatus of FIG. 27(*a*) to generate squares.

FIG. 28(*a*) shows a feedback circuit using the square root circuit of FIG. 27(*a*) to produce a square function. With $x$ fed in at 520, $-x^2$ appears at 524. A similar circuit is shown in FIG. 28(*b*) for producing $x^3$ at terminal 526 from an input of $-x$ at terminal 528 by use of the circuit of FIG. 27(*b*) in the feedback of an amplifier.

(14) Integral powers and special functions from trig. functions:

It has already been shown how easily a variable can be transformed to an arc sine. This permits the convenient use of many trigonometric relations for producing special functions. For example, consider the function $$y=\sqrt{1-x^2}$$

If $x$ is first transformed to an angle $\alpha=\arc\sin x$, as explained in application 2, and then the cosine of $\alpha$ is obtained, the result will be $\sqrt{1-x^2}$.

Generation of integral powers can be accomplished through the relations $x^2=\sin^2\alpha=\tfrac{1}{2}(1-\cos 2\alpha)$
$x^3=\sin^3\alpha=\tfrac{1}{4}(3\sin\alpha-\sin 3\alpha)$
$x^4=\sin^4\alpha=\tfrac{1}{8}(3-4\cos 2\alpha+\cos 4\alpha)$
$x^5=\sin^5\alpha=\tfrac{1}{16}(10\sin\alpha-5\sin 3\alpha+\sin 5\alpha)$, etc.

Figure 29:
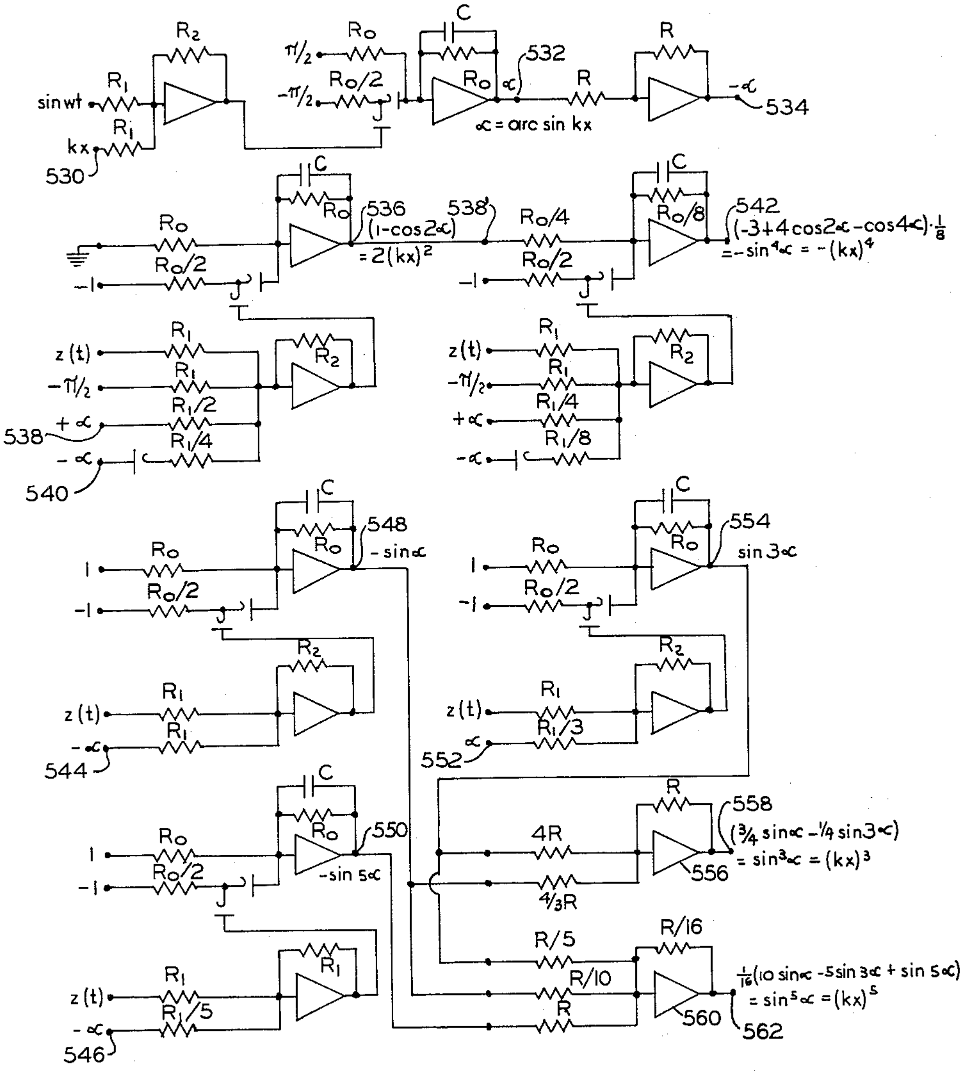
FIG. 29 is a schematic diagram of an apparatus using trigonometric relations to generate constant powers without the use of logarithms.

In FIG. 29 is shown a circuit employing these relations to generate the first five powers. It should be noted that the angle $\alpha$ is obtained as the arc sin $kx$ where $k$ is chosen as $(\sin\pi/10)_{max}{}^{1/x}$ so that the absolute value of $5\alpha$ will not exceed $\pi/2$. With $kx$ input at terminal 530, $\alpha$ appears at junction 532 and $-\alpha$ appears at terminal 534. Using a cosine generator similar to that of FIG. 7, slightly modified, there is generated at terminal 536 the quantity $(1-\cos 2\alpha)=2(kx)^2$ from inputs of $\alpha$ and $-\alpha$ (obtained from 532 and 534) at terminals 538 and 540. From the output of 536, the quantity $x^2$ can readily be obtained by eliminating the constant coefficient in the manner well known in the art.

Using a similar cosine generator circuit with the output of terminal 536 as one of its inputs at terminal 538', there is generated at terminal 542

$$(-3+4\cos 2\alpha-\cos 4\alpha)^{1/8}=-\sin^4\alpha=-(kx)^4$$

From the output at 542, the quantity $x^4$ can also be readily obtained. Using $-\alpha$ inputs at terminals 544 and 546 there are produced at terminals 548 and 550, respectively, the quantities $-\sin\alpha$ and $-\sin 5\alpha$. Similarly, using $\alpha$ input at terminal 552, there is produced at terminal 554 the quantity $\sin 3\alpha$. Using properly selected proportions of $-\sin\alpha$ and $\sin 3\alpha$ as the inputs to amplifier 556, there is produced at the output terminal 558 the quantity $$(\tfrac{3}{4}\sin\alpha-\tfrac{1}{4}\sin 3\alpha)=\sin^3\alpha=(kx)^3$$

from which $x^3$ can readily be obtained. In like manner, with the indicated proportioned inputs of the three sine functions, amplifier 560 produces at its output terminal 562 the quantity $$\tfrac{1}{16}(10\sin\alpha-5\sin 3\alpha+\sin 5\alpha)=\sin^5\alpha=(kx)^5$$

from which can readily be obtained $x^5$.

Those circuits of FIG. 29 which illustrate the method of producing the square and the fourth power demonstrate the use of the basic method of the invention even though physically they may appear to be deviating from the basic method of the invention. For example, terminal 542 is then output terminal of a combination of a comparator with an auxiliary function generator into the comparator of which is fed an arc sine function for comparison with an unknown that may generally be designated as $\alpha$. Under the simplest concept of the basic method of the invention, the output of such a combination might be expected to be the average of two values of the auxiliary variable wherein the two values are constants and would probably be expected to be the inverses of the limits of the arc sine function, namely, +1 and −1. Observation of the actual output at 542 would reveal, however, that the two discrete values of the auxiliary variable are not simply +1 and −1 but in fact are two other quantities which are not necessarily constant, although they will not vary appreciably during one cycle of the arc sine function. This apparatus can, however, be regarded as the combination into one piece of equipment of two separate pieces of equipment, one of which would be an elementary sine generator embodying the most elementary concept of the method of the invention, and the other of which would be a device for adding the output of this elementary sine generator to a variable quantity constituted by the output at terminal 536. Under this concept, the apparatus for generating the $-(kx)^4$ can be properly regarded as actually carrying out the basic elementary concept of the method of the invention. However, since the apparatus is actually one unified piece of equipment, it can also be regarded as performing the generation of a function of two variables wherein one variable is essentially $\alpha$ and the other variable is essentially the output of terminal 536. Under this concept of the method the two values of the auxiliary variable are now no longer regarded as constants whose magnitudes are determined by a function of one variable only, but rather, that they are variables whose magnitudes are determined essentially as functions of two variables. This concept is phrased in the following statement of a

METHOD OF GENERATING A FUNCTION OF TWO VARIABLES

Object: To generate $\phi=g(\beta,y)$ where $y=f((x)$.

*Step 1*.—Generate a periodic time representation of the inverse function $f^{-1}(y)$.

*Step 2*.—Compare the amplitude of this function with a given value $x_0$ of the independent variable of the function $f(x)$.

*Step 3*.—Generate, as a result of Step 2, a discontinuous function $$E(\beta,x,x_0)=\begin{cases}A_1 \text{ during an interval of time equal to that when } x\leq x_0\\ A_2 \text{ during an interval of time equal to that when } x>x_0\end{cases}$$

where the values of $A_1$ and $A_2$ do not vary appreciably over a single period of the time representation of $f^{-1}(y)$.

*Step 4*.—Take the time average of $E(\beta,x,x_0)$.

The apparatuses of FIGS. 15 and 16 also illustrate this concept of a method of the invention. In FIG. 15, for example, an object is to generate $r \sin \theta$, which may be considered as a function of the two variables $r$ and $\sin \theta$. The variable $\sin \theta$ may in turn be considered as a function of $\theta$. Applying the method of the invention for the generation of a function of two variables, the first step is to produce a periodic time representation of the arc sine of $\theta$ which is fed in at terminal 284. Thereafter, the comparison of $\theta$ with the time function is carried out and the two values of the auxiliary variable are then generated and averaged. In this case, however, the auxiliary variable has the two values $(+1)r$ and $(-1)r$ from which it is apparent that the values $A_1$ and $A_2$ are functions of $r$ as well as $\theta$. One of the requirements in the application of this method is, as previously mentioned, that $r$ must not vary appreciably during a single period of the arc sine time function. Under the more elementary concept of the basic method of the invention, the apparatus of FIG. 15 may be regarded as generating $+1$ and $-1$ in accordance with the basic method and then multiplying these constants by $r$.

It seems appropriate at this point to set down an affirmation of the explicit meanings of certain terms and certain usages used throughout this application.

The term "amplitude" used in reference to the amplitude of the periodic time function and the comparison of the amplitude of a time function with another quantity means in this application the instantaneous value or instantaneous magnitude of the time function. This meaning is consonant with the current usage in this art as evidenced, for example, by the usage of this term in the book entitled "Waveforms," volume 19 of the MIT Radiation Laboratory Series published in 1949 by McGraw-Hill Book Company. In this respect, the means of the word "amplitude" differs from the old usage in elementary A.C. theory where it meant the maximum instantaneous value of a periodic wave form.

When reference is made to the generation of a quantity which is "essentially $x^2$" or "substantially $x^2$," this is intended to include $x^2$, $-x^2$, $kx^2$, and $-kx^2$ since it is easily within the scope of those skilled in the art to accomplish the reversal of signs and the application or removal of multiplying constants and factors, also known as scaling factors.

When a statement is made such as that "the independent variable is applied to a certain terminal," this always means that some quantity whose value represents the value of the independent variable is applied to the terminal. For example, it may be that an angle of 90° would be represented by a voltage of 100 volts. The use of scaling factors to convert from the actual variable to the actual quantity used in equipment is altogether common. Since it sometimes becomes unwieldy to recite that "a quantity representing the value of the independent variable" be applied to a certain terminal, the shorter recitation, which is to be considered fully equivalent, is often used, stating simply that "the independent variable is applied to a certain terminal." Similarly, the full and exact nomenclature is often avoided for the sake of brevity in situations where the terminology is unequivocally clear to those skilled in the art. For example, the term $\pi/2$ is often used instead of the term $\pi/2$ radians.

Although electronic analog computer circuitry was used to exemplify the physical realization of the various illustrative applications, it is again emphasized that the methods of the invention can be realized in a variety of ways. For instance, electronically, D.C. amplifiers are not essential to the methods of the invention, since all that is involved are the operations of amplitude comparison, selection and smoothing; these can be accomplished with A.C. circuitry alone.

Obviously many modifications and variations of the present invention are possible in the light of the above teachings. It is therefore to be understood that within the scope of the appended claims, the invention can be practiced otherwise than as specifically described.

What is claimed is:

1. An apparatus for generating a function of an independent variable, said function being symbolized $y=f(x)$ with $x$ ranging between limits $x_1$ and $x_2$ and $y$ correspondingly ranging between limits $y_1$ and $y_2$, and said independent variable being symbolized $x$, said apparatus comprising:

means for generating a periodic time representation of the inverse of said function;

said inverse of said function being symbolized $x=f^{-1}(y)$;

said periodic time representation being defined as the identical repetition in equal intervals of time, called periods, of a time representation of said inverse of said function;

said time representation of said inverse of said function being accomplished by essentially replacing said variable $y$ with real time in which replacement each of said intervals of time represents the ranging of $y$ between its limits $y_1$ and $y_2$, and said time representation of said inverse of said function being defined as being composed of the entirety of a set of values assumed in time sequence by a physical quantity, symbolized $q$, whose magnitude is directly proportional to $f^{-1}(kt+y_1)$ wherein $t$ signifies real time, $t$ varies from zero to $$\frac{y_2-y_1}{k}$$

$t=0$ is the instant of time defining the start of each of said equal time intervals, the length of each said time intervals is $$\frac{y_2-y_1}{k}$$

the variable $t$ is limited in its range from zero to $$\frac{y_2-y_1}{k}$$

and $k$ is an arbitrary constant;

auxiliary function generator means for generating an auxiliary function having only two values;

amplitude comparator means for comparing the essential value of said first-mentioned independent variable with the essential value of said periodic time representation and for controlling said auxiliary function generator to cause said auxiliary function generator to generate one of said two values of said auxiliary function during an interval of time equal to that when the value of said periodic time representation exceeds the value of said first-mentioned independent variable and to generate the other of said two values of said auxiliary function during an interval of time equal to that when the value of said periodic time function is equal to or less than the value of said first-mentioned independent variable; and means for averaging the output of said auxiliary function generator.

2. An apparatus for generating the arc sine of an independent variable comprising a comparator; means for supplying to said comparator a periodic time representation of a sine function and an input terminal for supplying said independent variable to said comparator; an auxiliary variable function generator controlled by the output of said comparator for generating an auxiliary variable of value representing $\pi/2$ radians during an interval of time equal to that when the value of said sine time function is equal to or less than said independent variable and of value representing $-\pi/2$ radians during an interval of time equal to that when the value of said sine time function is greater than said independent variable; and means for averaging the values of said auxiliary variable, this average being proportional to the arc sine of said independent variable.

3. The apparatus of claim 2 wherein the output of said averaging means forms a first part of the input to an amplifier and wherein the output of said amplifier constitutes effectively the said independent variable supplied to said comparator; and means for supplying as a second part of the input to said amplifier so as to be added to said first part, the negative of a primary variable, whereby the output of said amplifier constitutes the sine of said primary variable.

4. The apparatus of claim 3 further including means for adding a third part to the input to said amplifier of value representing $\pi/2$ radians whereby the output of said amplifier constitutes the negative of the cosine of the primary variable.

5. An apparatus for generating a function of an independent variable comprising a comparator; means for supplying to said comparator a periodic time representation of the arc sine function; means for supplying to said comparator said independent variable for comparison by said comparator with the value of said arc sine function; an auxiliary function generator controlled by the output of said comparator for generating an auxiliary variable representing $-1$ during an interval of time equal to that during which said arc sine function equals or exceeds said independent variable and representing $+1$ during an interval of time equal to that during which said arc sine function is less than the value of said independent variable; and means for averaging the output of said auxiliary function generator whereby to produce the sine of said independent variable.

6. The apparatus of claim 5 further including means for supplying to said comparator a quantity representing $-\pi/2$ added algebraically to said independent variable whereby the output of said averaging means is the negative of the cosine of said independent variable.

7. An apparatus for generating a function of a primary variable comprising a comparator; means for supplying a periodic time representation of a sine function to said comparator; means for supplying an independent variable to said comparator to be compared in magnitude with said sine time function; auxiliary function generator means controlled by the output of said comparator for generating on the basis of the comparison of said sine time function with said independent variable an auxiliary variable having only two values representing $\pi/2$ and $-\pi/2$; means for averaging the output of said auxiliary function generator; an amplifier; means for supplying as a first input component to said amplifier the output of said averaging means; means for supplying as a second input component to said amplifier the actual value of the negative of said primary variable; means operable whenever the absolute value of said primary variable exceeds $\pi/2$, for supplying as a third input component to said amplifier twice the difference between the absolute actual value of said primary variable and $\pi/2$ whereby the effective absolute value of the primary variable input to said amplifier never exceeds $\pi/2$; and means for connecting the output of said amplifier to said comparator so that the output of said amplifier constitutes the independent variable input to said comparator.

8. The apparatus of claim 7 further including means for supplying to said amplifier an additional input representing $\pi/2$ whereby the output of said amplifier constitutes the negative of the cosine of said primary variable over a range of said variable representing $3\pi$.

9. An apparatus for generating a function of an independent variable which comprises a comparator; means for supplying to said comparator a periodic time representation of the arc sine function; means for supplying to said comparator said independent variable and means operable whenever the absolute value of said independent variable exceeds $\pi/2$, for supplying to said comparator to be added to the actual value of said independent variable the quantity $$\sum_{k=-1,1}^{k=n} (-1)^k 2[\theta-\pi/2(2k-1)]$$

where $n$ is an integer such that $(2n-1)\pi/2$ is that odd multiple of $\pi/2$ whose sign is the same as the sign of $\theta$ and whose absolute value is nearest to but less than the absolute value of $\theta$, and $\theta$ is the actual value of the independent variable, whereby the effective value of said independent variable supplied to said comparator for comparison with said periodic time representation of the arc sine never exceeds $\pi/2$; an auxiliary function generator controlled by the output of said comparator for generating an auxiliary function having only two values representing $+1$ and $-1$; and means for averaging the output of said auxiliary function generator whereby to produce the sine of said independent variable.

10. The apparatus of claim 9, further including means for supplying $\pi/2$ to said comparator whereby the output of said averaging means constitutes the negative of the cosine of the independent variable for a range of the independent variable lying between $-\pi$ and $+2\pi$.

11. An apparatus for producing from a primary variable, subject to substantially unlimited increase in absolute magnitude, a secondary variable whose sine is always the same as that of the primary variable and whose absolute magnitude never exceeds $\pi/2$, comprising an integrating circuit, whose output is constituted by said secondary variable; means for supplying initially to said integrating circuit the value of said primary variable; means for supplying initially and continuously thereafter to said integrating circuit the first time derivative of said primary variable; the output of said integrating circuit constituting the sum of the initial value of said primary variable plus the time integral of the first derivative with respect to time of said primary variable; and means operable when said sum reaches an absolute magnitude of $\pi/2$ for reversing the sign of the first time derivative of said primary variable supplied to said integrating circuit whereby the value of said secondary variable oscillates between $+\pi/2$ and $-\pi/2$ as the value of said primary variable continuously increases.

12. An apparatus for generating a function of an independent variable comprising a comparator;

means for supplying to said comparator a periodic time representation of the arc sine function;

means for supplying to said comparator said independent variable for comparison by said comparator with the value of said arc sine function; said last-named means being constituted by an apparatus for producing from a primary variable, subject to substantially unlimited increase in absolute magnitude, a secondary variable which constitutes said independent variable, and whose sine is always the same as that of the primary variable and whose absolute magnitude never exceeds $\pi/2$, said last-named apparatus including an integrating circuit whose output is constituted by said secondary variable;

means for supplying initially and continuously thereafter to said integrating circuit the first time derivative of said primary variable;

the output of said integrating circuit constituting the sum of the initial value of said primary variable plus the time integral of the first derivative with respect to time of said primary variable; and means operable when said sum reaches an absolute magnitude of $\pi/2$ for reversing the sign of the first time derivative of said primary variable supplied to said integrating circuit whereby the value of said secondary variable oscillates between $+\pi/2$ and $-\pi/2$ as the value of said primary variable continuously increases;

an auxiliary function generator controlled by the output of said comparator for generating an auxiliary variable representing $-1$ during an interval of time equal to that during which said arc sine function equals or exceeds said independent variable and representing $+1$ during an interval of time equal to that during which said arc sine function is less than the value of said independent variable; and means for averaging the output of said auxiliary function generator whereby to produce the sine of said independent variable.

13. The apparatus of claim 12, further including means for supplying to said comparator a quantity representing $-\pi/2$ added algebraically to said independent variable whereby the output of said averaging means is the negative of the cosine of said independent variable.

14. An apparatus for generating a function of a primary variable comprising a comparator; means for supplying to said comparator a periodic time representation of a sine function; means for supplying to said comparator for comparison by said comparator with said periodic time representation an independent variable; an auxiliary function generator controlled by the output of said comparator for generating an auxiliary variable of value $\pi/2$ during an interval of time equal to that when the value of said sine time function is equal to or less than said independent variable and of value $-\pi/2$ during an interval of time equal to that when the value of said sine time function is greater than said independent variable; means for averaging the values of said auxiliary variable to produce the arc sine of said independent variable; an amplifier; means for supplying the output of said averaging means constituting the arc sine of said independent variable to said amplifier as a first part of the input to said amplifier; means for supplying the output of said amplifier to said comparator whereby the output of said amplifier effectively constitutes the said independent variable supplied to said comparator; and means for supplying as a second part of the input to said amplifier so as to be added to said first part a primary variable whereby the output of said amplifier constitutes the sine of said primary variable; said last-named means being constituted by the apparatus of claim 11.

15. The apparatus of claim 14 further including means for adding a third part to the input to said amplifier of value representing $\pi/2$ whereby the output of said amplifier constitutes the negative of the cosine of the primary variable.

16. An apparatus for generating a function of an independent variable comprising a circuit for producing a periodic time representation of an exponential function of the form $Be^{kt}$; a comparator; means for supplying said exponential function output of said circuit to said comparator; means for supplying to said comparator the product of an independent variable multiplied by B; an auxiliary function generator controlled by the output of said comparator for generating an auxiliary variable having only the two values zero and $$\ln\left[\frac{D}{B}\right]$$

where D is the maximum value of said periodic time representation of said exponential function; and means for averaging the output of said auxiliary function generator whereby to produce the natural logarithm of said independent variable.

17. An apparatus for generating a function of an independent variable which comprises means for producing a periodic time representation of the form $Be^{-at}+C$; means for subtracting the value C from said periodic time representation to produce a pure negative exponential of the form $Be^{-at}$; a comparator, means for supplying said pure negative exponential to said comparator; means for supplying said independent variable to said comparator to be compared with said time representation of said pure negative exponential; an auxiliary function generator controlled by said comparator for generating an auxiliary function having only the two values zero and $$\ln\left[\frac{B}{D}\right]$$

where D is the limiting value of said periodic time representation of said pure negative exponential at the end of its period; and means for averaging the output of said auxiliary function generator.

18. Equipment for generating a function of the form $x^{1/n}$ where $n$ is an integer comprising apparatus for producing a periodic time representation essentially of the form $x^{kt}$; said apparatus including means for producing a periodic time representation of a linear function, and integrating means for sequentially integrating $(n-1)$ times, with respect to time, said periodic time representation of said linear function to produce said function of the form essentially $x^{kt}$; a comparator; means for supplying to said comparator a quantity representing the absolute magnitude of $x$ and for supplying to said comparator said periodic time representation of the form $x^{kt}$ for comparison by said comparator with said quantity; an auxiliary function generator controlled by the output of said comparator for generating an auxiliary variable having only two values; and means for averaging the output of said auxiliary function generator.

19. The method of generating a function $y=f(x)$ which comprises the steps of generating a periodic time representation of the inverse function $f^{-1}(y)$, the period of the time representation being sufficiently short that $y$ does not change appreciably during the period; comparing the amplitude of the said periodic time representation with a given value $x_0$ of the independent variable of the required function $f(x)$; generating, as a result of said comparison, a discontinuance function $$E(x, x_0)=\begin{cases} A_1 \text{ during an interval of time equal to that when } x \leq x_0. \\ A_2 \text{ during an interval of time equal to that when } x > x_0. \end{cases}$$

where $A_1$ and $A_2$ are the extreme values of the function $y$ corresponding to the extreme variations of the independent variable $x$ for monotonic variation in the region under consideration; and taking a time average of $E(x, x_0)$.

20. The method of generating a function of an independent variable, which function lies in the range fixed between two predetermined limiting values; said method comprising the steps of generating a periodic time representation of the inverse of said function; comparing the value of said independent variable with said periodic time representation; generating an auxiliary discontinuance function having only two values, a first value equal to one of said predetermined limiting values during a time interval equal to that portion of the period of said periodic time representation wherein the periodic time representation exceeds the value of said independent variable; said auxiliary function having a second value equal to the other of said predetermined limiting values during a time interval equal to the remainder of said period; and averaging said auxiliary function.

21. The method of generating a function $y=f(x)$ which comprises the steps of generating a periodic wave form $c(t)$, containing a periodic time representation of the inverse function $f^{-1}(y)$, wherein $T$=period of $c(t)$, wherein $c(t)$ is constant during each portion of the period T not representing $f^{-1}(y)$ and wherein $y$ does not change appreciably during the period T; comparing the amplitude of the periodic wave form with a given value $x_0$ of the independent variable of the required function $f(x)$; generating, as a result of said comparison, a discontinuous function $$E(c(t), x_0)=\begin{cases} A_0+\frac{A_1}{K} \text{ during an interval of time equal to that when } c(t)\leq x_0. \\ A_0+\frac{A_2}{K} \text{ during an interval of time equal to that when } c(t)>x_0. \end{cases}$$

where the values of $A_1$ and $A_2$ do not vary appreciably over a single period of $c(t)$, and where $T_D$=that portion of T devoted to representing $f^{-1}(y)$ $T_N$=that portion of T not devoted to representing $f^{-1}(y)$ $K=T_D/T$ $1-K=T_N/T$ $p$=the fraction of $T_N$ devoted to $A_1$ $1-p$=the fraction of $T_N$ devoted to $A_2$ $$A_0=\frac{(1-K)}{K}[pA_1+(1-p)A_2]$$

and taking the time average of $E(c(t),x_0)$.

22. The method of generating a function $\phi=g(\beta,y)$ where $y=f(x)$ which comprises the steps of generating a periodic time representation of the inverse function $f^{-1}(y)$, the period of the time representation being sufficiently short that $y$ does not change appreciably during the period; comparing the amplitude of this time function with a given value $x_0$ of the independent variable of the function $f(x)$; generating, as a result of the comparison, a discontinuous function $$E(\beta, x, x_0)=\begin{cases} A_1 \text{ during an interval of time equal to that when } x\leq x_0. \\ A_2 \text{ during an interval of time equal to that when } x>x_0. \end{cases}$$

where the values of $A_1$ and $A_2$ do not vary appreciably over a single period of the time representation of $f^{-1}(y)$; and taking a time average of $E(\beta,x,x_0)$.

23. The method of generating a function $y=f(x)$ which comprises the steps of generating a periodic time representation of the inverse function $f^{-1}(y)$; comparing the amplitude of this time function with a given value $x_0$ of the independent variable of the required function $f(x)$; generating as a result of the comparison a discontinuance function $$E(x, x_0)=\begin{cases} A_1 \text{ during an interval of time equal to that when } x\leq x_0. \\ A_2 \text{ during an interval of time equal to that when } x>x_0. \end{cases}$$

where the values of $A_1$, $A_2$, and $x_0$ do not vary appreciably over a single period of the time representation of $f^{-1}(y)$; and taking the time average of $E(x,x_0)$.

References Cited by the Examiner

UNITED STATES PATENTS

| | | | |
|---|---|---|---|
| 2,605,962 | 8/1952 | Berger | 235—193 |
| 2,773,641 | 12/1956 | Baum | 235—194 |
| 2,809,784 | 10/1957 | Brook | 235—193 |
| 2,849,181 | 8/1958 | Lehmann | 235—186 X |
| 2,922,578 | 1/1960 | Davidson | 235—189 |
| 2,926,852 | 3/1960 | Bennett | 235—189 |
| 2,973,146 | 2/1961 | Schmid | 235—194 |
| 2,975,972 | 3/1961 | Dworetzky | 235—186 |
| 2,978,178 | 4/1961 | Patterson | 235—193 |
| 2,979,263 | 4/1961 | Keister. | |
| 2,983,448 | 5/1961 | Gray | 235—186 |
| 3,048,337 | 8/1962 | Byerly | 235—186 |

OTHER REFERENCES

Pages 41–47, 3–1958, Schmid, A Transistorized Four-Quadrant Time-Division Multiplier, I.R.E. Trans. on Electronic Computers.

MALCOLM A. MORRISON, *Primary Examiner.*

CORNELIUS D. ANGEL, ABRAHAM BERLIN, *Examiners.*

J. M. FINKELSTEIN, C. L. WHITHAM, K. W. DOBYNS, *Assistant Examiners.*